US011768756B2

(12) United States Patent
Negoro

(10) Patent No.: US 11,768,756 B2
(45) Date of Patent: Sep. 26, 2023

(54) METHOD FOR ENABLING VERIFICATION OF LEGITIMACY OF AN ASYNCHRONOUS ALGORITHM GENERATED WHEN A LOGICALLY CONNECTED PROGRAM IS EXECUTED

(71) Applicant: Fumio Negoro, Kanagawa (JP)

(72) Inventor: Fumio Negoro, Kanagawa (JP)

( * ) Notice: Subject to any disclaimer, the term of this patent is extended or adjusted under 35 U.S.C. 154(b) by 92 days.

(21) Appl. No.: 16/955,320

(22) PCT Filed: Dec. 16, 2019

(86) PCT No.: PCT/JP2019/049213
§ 371 (c)(1),
(2) Date: Jun. 18, 2020

(87) PCT Pub. No.: WO2021/124411
PCT Pub. Date: Jun. 24, 2021

(65) Prior Publication Data
US 2022/0245053 A1 Aug. 4, 2022

(51) Int. Cl.
*G06F 9/44* (2018.01)
*G06F 11/36* (2006.01)

(52) U.S. Cl.
CPC ...... *G06F 11/3612* (2013.01); *G06F 11/3616* (2013.01)

(58) Field of Classification Search
None
See application file for complete search history.

(56) References Cited

U.S. PATENT DOCUMENTS

| | | | |
|---|---|---|---|
| 9,792,443 B1* | 10/2017 | Sheridan | G06F 21/577 |
| 2009/0288073 A1* | 11/2009 | Gosalia | G06F 8/33 717/141 |
| 2014/0047413 A1* | 2/2014 | Sheive | G06F 8/33 717/110 |
| 2019/0005117 A1* | 1/2019 | Vasisht | G06F 8/35 |
| 2019/0102166 A1* | 4/2019 | Zoubeiri | G06F 8/30 |

* cited by examiner

*Primary Examiner* — Qamrun Nahar
(74) *Attorney, Agent, or Firm* — DILWORTH IP, LLC

(57) ABSTRACT

The present invention proposes a method for determining whether or not the legitimacy of an algorithm generated by LCPS during operation is established by generating the super-language context of LCPS from the LCPS to be verified by the generalized method of the present invention without using any verification data, and analyzing it by the generalized method of the present invention. With this method, all bug events that LCPS develops during operation are revealed as bug syntaxes in the generalized method of the present invention. If there is no bug syntax in LCPS, the algorithm generated by LCPS when operating is legitimate. The above-described method may be performed manually or by a computer according to a dedicated program.

4 Claims, 26 Drawing Sheets

Section A / Section C / Section E

| Line number (TOX) | Giving hyperlingual coordinates to subject names and variable subject names | Activation parameters Information 1 Giving harmonic coordinates | | | | | Syntax type | Subject vector type assignment |
|---|---|---|---|---|---|---|---|---|
| | | TCX | TCY=TCZ1 | TCZ2 | TCZ3 | TCZ4 | | |
| *The following area definition statement | | | | | | | | |
| 010 | C[010,] | | | | | | Area definition statement | --- |
| 020 | R[020,] | | | | | | Area definition statement | --- |
| 030 | D[030,] | | | | | | Area definition statement | --- |
| 040 | A[040,] | | | | | | Area definition statement | --- |
| 050 | B[050,] | | | | | | Area definition statement | --- |
| 060 | E[060,] | | | | | | Area definition statement | --- |
| 070 | F1(F)[070,] | | | | | | Area definition statement | --- |
| 071 | F1(R)[071,] | | | | | | Area definition statement | --- |
| 080 | G[080,] | | | | | | Area definition statement | --- |
| *Executable statements below | | | | | | | | |
| 100 | G[080,100]=10[,100] | 100 | 110 | | | | Stationary sentence | L2(G:100) |
| 110 | L1[110,] READ F1(F[070,110],R[071,110]) | 110 | 120 | | | | Input sentence | R2(F1:110) |
| 120 | F[070,120] =R[071,110]-F[070,110] | 120 | 130 | | | | Assignment statement | L4(F:120) |
| 130 | IF R[071,110]<F[070,110] | 130 | 140 | 150 | 150 | 160 | Judgment sentence | L3(140)140,150,150,160 |
| 140 | GO TO L1[,110] | 140 | 110 | | | | Control statement | --- |
| 150 | END-IF[,150] | 150 | 160 | | | | Translation | --- |
| 160 | CLOSE F1[,160] | 160 | 170 | | | | Translation | --- |
| 170 | E[060,170]=B[050,?]-F[070,120] | 170 | 180 | | | | Assignment statement | L4(E:170) |
| 180 | IF B[050,?]<F[070,120] | 180 | 190 | 200 | 210 | 220 | Judgment sentence | L3(A)190,200,210,220 |
| 190 | A[040,190]=D[030,?]+R[71,110]+5[,190] | 190 | 210 | | | | Assignment statement | L4(A:190) |
| 200 | A[040,200]=2[,200]*R[71,110]+5[,200] | 200 | 210 | | | | Assignment statement | L4(A:200) |
| 210 | END-IF[,210] | 210 | 220 | | | | Translation | --- |
| 220 | C[010,220]=G[080,100]-A[040,?] | 220 | 230 | | | | Assignment statement | L4(C:220) |
| 230 | B[050,230]=G[080,100]-F[070,120] | 230 | 240 | | | | Assignment statement | L4(B:230) |
| 240 | IF(B[50,230]+C[10,220])X0[,240] | 240 | 250 | 260 | (TCZ3) | (TCZ4) | Judgment sentence | L3(D:250)250,260,(TCZ3),(TCZ4) |
| 250 | D[030,250]=B[050,230]+C[010,220] | 250 | 260 | | | | Assignment statement | L4(D:250) |
| 260 | END-IF[,260] | | | | | | Translation | --- |
| (Omitted) | | | | | | | | |

Section B / Section D / Section F

FIG. 2

Enlarged View of Section A of FIG. 2

| Line number (TCX) | Giving hyperlingual coordinates to subject names and variable subject names |
|---|---|
| * The following area definition statement | |
| 010 | C[010.] |
| 020 | R[020.] |
| 030 | D[030.] |
| 040 | A[040.] |
| 050 | B[050.] |
| 060 | E[060.] |
| 070 | F1(F)[070.] |
| 071 | F1(R)[071.] |
| 080 | G[080.] |
| * Executable statements below | |

FIG. 2A

Enlarged View of Section B of FIG. 2

| 100 | G[080,100]=10[,100] |
|---|---|
| 110 | L1[110] READ F1(F[070,110],R[071,110]) |
| 120 | F[070,120] =R[071,110]-F[070,110] |
| 130 | IF R[071,110]<F[070,110] |
| 140 | GO TO L1[,110] |
| 150 | END-IF[,150] |
| 160 | CLOSE F1[,160] |
| 170 | E[060,170]=B[050,?]-F[070,120] |
| 180 | IF B[050,?]=F[070,120] |
| 190 | A[040,190]=D[030,?]+R[71,110]+5[,190] |
| 200 | A[040,200]=2[,200]*R[71,110]+5[,200] |
| 210 | END-IF[,210] |
| 220 | C[010,220]=G[080,100]-A[040,?] |
| 230 | B[050,230]=G[080,100]-F[070,120] |
| 240 | IF(B[50,230]+C[10,220])<0[,240] |
| 250 | D[030,250]=B[050,230]+C[010,220] |
| 260 | END-IF[,260] |
| (Omitted) | |

FIG. 2B

Enlarged View of Section C of FIG. 2

| Activation parameters |
|---|
| Information 1 |

| TCX | TCY=TCZ1 | TCZ2 | TCZ3 | TCZ4 |
|---|---|---|---|---|
| | Giving harmonic coordinates | | | |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

FIG. 2C

Enlarged View of Section D of FIG. 2

| | | | | |
|---|---|---|---|---|
| 100 | 110 | | | |
| 110 | 120 | | | |
| 120 | 130 | | | |
| 130 | 140 | 150 | 150 | 160 |
| 140 | 110 | | | |
| 150 | 160 | | | |
| 160 | 170 | | | |
| 170 | 180 | | | |
| 180 | 190 | 200 | 210 | 220 |
| 190 | 210 | | | |
| 200 | 210 | | | |
| 210 | 220 | | | |
| 220 | 230 | | | |
| 230 | 240 | | | |
| 240 | 250 | 260 | (TCZ3) | (TCZ4) |
| 250 | 260 | | | |
| | | | | |
| | | | | |

FIG. 2D

Enlarged View of Section E of FIG. 2

| Syntax type | Subject vector type assignment |
|---|---|
|  |  |
|  |  |
|  |  |
| Area definition statement | — |
| Area definition statement | — |
| Area definition statement | — |
| Area definition statement | — |
| Area definition statement | — |
| Area definition statement | — |
| Area definition statement | — |
| Area definition statement | — |
| Area definition statement | — |
|  |  |
|  |  |

FIG. 2E

Enlarged View of Section F of FIG. 2

| | |
|---|---|
| Stationary sentence | L2(G:100) |
| Input sentence | R2(F1:110) |
| Assignment statement | L4(F:120) |
| Judgment sentence | L3(140) 140,150,150,160 |
| Control statement | — |
| Translation | — |
| Translation | — |
| Assignment statement | L4(E:170) |
| Judgment sentence | L3(A)190,200,210,220 |
| Assignment statement | L4(A:190) |
| Assignment statement | L4(A:200) |
| Translation | — |
| Assignment statement | L4(C:220) |
| Assignment statement | L4(B:230) |
| Judgment sentence | L3(D:250) 250,260,(TCZ3),(TCZ4) |
| Assignment statement | L4(D:250) |
| Translation | — |

FIG. 2F

Section A ────────────────────── Section B

| | LCPS Analysis Information | | | | | | |
|---|---|---|---|---|---|---|---|
| | Information 2 | Information 3 | | | Information 4 | Information 5 | Information 6 |
| Line number (TCX) | Beginning subject name | Context subject name | {The context is broken} | Cause of the bug | {Bug event} | {Bug event sort code} | {Partial destruction range} | {Data swing syntax} |
| * The following area definition statement | | | | | | | | |
| 010 | | | | | | | | |
| 020 | | | | | | | | |
| 030 | | | | | | | | |
| 040 | | | | | | | | |
| 050 | | | | | | | | |
| 060 | | | | | | | | |
| 070 | | | | | | | | |
| 071 | | | | | | | | |
| 080 | | | | | | | | |
| * Executable statements below | | | | | | | | |
| 100 | | 100 | | | | | | |
| 110 | | 110 | | | | | | |
| 120 | 120 | | | | | | | |
| 130 | | | | | | | | |
| 140 | | | | | | | | |
| 150 | | | | | | | | |
| 160 | | | | | | | | |
| 170 | | | | | | | 2 | 170-230 | 170 |
| 180 | | | | | | | | |
| 190 | | | | | | | 2 | 190-250 | 190 |
| 200 | | | | | | | | |
| 210 | | | | | | | | |
| 220 | | | | | | | 2 | 190-220 | 220 |
| 230 | | | | | | | | |
| 240 | | | | | | | | |
| 250 | | | | | | | | |
| 260 | | | | | | | | |
| (Omitted) | | | | | | | | |

*FIG. 3*

Enlarged View of Section A of FIG. 3

| Line number (TCX) | LCPS Analysis Information | | | |
|---|---|---|---|---|
| | Information 2 | | Information 3 | |
| | Beginning subject name | Context subject name | {The context is broken} | Cause of the bug |
| * The following area definition statement | | | | |
| | | | | |
| 010 | | | | |
| 020 | | | | |
| 030 | | | | |
| 040 | | | | |
| 050 | | | | |
| 060 | | | | |
| 070 | | | | |
| 071 | | | | |
| 080 | | | | |
| | | | | |
| * Executable statements below | | | | |
| | | | | |
| 100 | | 100 | | |
| 110 | | 110 | | |
| 120 | 120 | | | |
| 130 | | | | |
| 140 | | | | |
| 150 | | | | |
| 160 | | | | |
| 170 | | | | |
| 180 | | | | |
| 190 | | | | |
| 200 | | | | |
| 210 | | | | |
| 220 | | | | |
| 230 | | | | |
| 240 | | | | |
| 250 | | | | |
| 260 | | | | |
| (Omitted) | | | | |

*FIG. 3A*

Enlarged View of Section B of FIG. 3

| Information 4 | | Information 5 | Information 6 |
|---|---|---|---|
| {Bug event} | {Bug event sort code} | {Partial destruction range} | {Data swing syntax} |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | 2 | 170-230 | 170 |
| | 2 | 190-250 | 190 |
| | | | |
| | 2 | 190-220 | 220 |
| | | | |
| | | | |
| | | | |

FIG. 3B

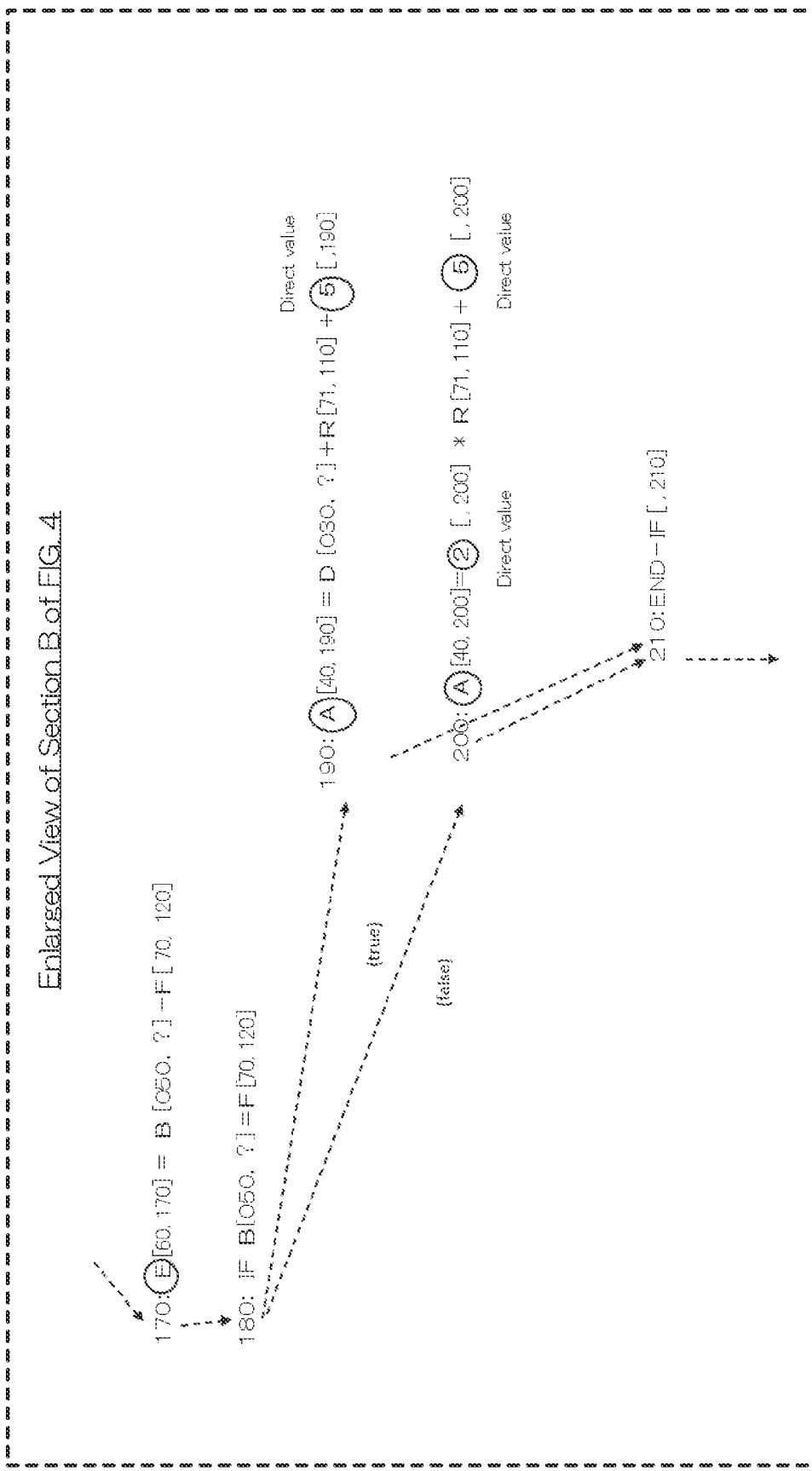

Enlarged View of Section D of FIG. 4

LOPS super language context structure (1) In the LOPS superlanguage context, if the subject subject name is orthodox, the subject names of all subject names belonging to the superlanguage context are orthodox.

(2) The subject of the starting subject name of the LOPS super-lingual context is orthodox when all the paths connecting the starting subject name (one) and the terminal subject name (one or more) are established.

(3) In other words, the subject of the starting subject name is orthodox is the case where the entire condition is satisfied. Refer to relevant section.

(4) If you look closely, in the superlinguistic context, the whole of the sufficient condition to capture the orthodoxy of the subject of the starting subject name will be captured using all subject names.

(5) Therefore, the establishment of the orthodoxy of the subject of the starting subject name of the superlanguage context is understood as the whole of the sufficient condition of the orthodoxy of the subject of all subject names related to the superlanguage context.

(6) Then, the orthodox nature of the subject of the starting subject name of the superlanguage context is established when the orthodonticity of the subject of all subject names related to the superlanguage context is established.

(7) In other words, the superlinguistic context established using the starting subject name has a structure for capturing the legitimacy of the starting subject name and all subject names other than the starting subject name.

(8) As a result, if the subject of the starting subject name is not established, it establishes a mechanism for catching the bug syntax. The present invention is a method of capturing bug syntax using this relationship. See Figure 5

Enlarged View of Section A of FIG. 8

1. LCPS (Compiled program source)

2. The parameters for activating the LCPS are shown below. (11 types of syntax, subject name, variable subject name, subject, harmonic coordinates, superlanguage coordinates, 5 types of subject vectors)

A set of harmonic coordinates is assigned to the entire LCPS.

3. The overall sufficient condition of a program is an aspect of the execution state of the program.

3.1: The full condition of SF is captured using the relationship of all subject vectors (Corridor to the present invention)

3.2: Only sufficient conditions can be captured in LCPS.

4. The solution of a program is an aspect in which the subject (the aspect of materialization) of all subject names (region names) belonging to the program is established.

4.1: The LCPS that results in a logical combination cannot find its own solution.

4.2: In SF, SF is designed as a synchronous structure so that its own solution (subject lineage) is established.

5. A fatal defect problem of LCPS that cannot be solved.

5.1: The relationship between the LCPS part and the whole is inevitably obscured. There is a possibility that the superlinguistic coordinates cannot be given or are erroneously written.

5.2: A universal verification method that guarantees the legitimacy of LCPS is not established.

5.3: The LCPS operates regardless of validity.

5.4: The fatal defect problem of LCPS continues forever in an unresolved state unless the logically coupled structure of CPS is excluded.

FIG. 8A

Enlarged View of Section B of FIG. 8

3.2.1: In the research process of the present invention, a method of capturing "LCPS context" was discussed.

(1) The context of LCPS is a mechanism for capturing an illegal value that develops in the subject of the syntax belonging to CPS at the time of execution.

(2) The LCPS context mechanism is designed based on the SF's dynamic algorithm (synonymous with the whole SF sufficient condition).

(3) The LCPS context consists of two types of contexts defined as harmonic context and hyperlingual context.

(4) Harmonic context is a syntactic context ordered by harmonic coordinate line numbers.

Harmonic coordinates are the only set of coordinates governing the entire LCPS. See dotted line in Fig. 4

(5) The key language context is the context of the TCX2 in the coordinate coordinates of the subject name and variable subject name belonging to the syntax.

See (6) below, dotted arrow line in Fig.4

(6) The super-language coordinate is a pair of line numbers (TCX1, TCX2) given to the variable subject name belonging to the syntax.

TCX1 is the line number of the area definition statement that defines the variable subject name area, and TCX2 is the line number of the syntax that materializes the variable subject name area. The superordinate coordinate TCX1 assigned to the subject name is the same as the variable subject name, and TCX2 is the line number of the syntax to which the subject name belongs.

FIG. 8B

Enlarged View of Section C of FIG. 8

(7) The superlanguage context is the context of the subject name and variable subject name connected by the harmonic coordinate line number TOX2.

Refer to the solid line in Fig. 4

(8) To LCPS If the following activation parameters are imposed, all information (FIG. 2) for capturing the context of the LCPS is obtained from the LCPS.

See Figure 2

(9) The following information is obtained from FIG. The required information is recorded in FIG. See Figure 3

(10) Information required from Figure 2

10.1: A single subject name for the LCPS context
   10.2: Terminating subject names of all contexts in the LCPS
   10.3 Syntax that causes data fluctuations

(11) LCPS context breaks 11.1: The cause of discontinuity in the LCPS context is an error in the superlinguistic coordinates.

The cause is that there is no solution in LCPS.

11.2: How to find the discontinuity of the context of the LCPS ① The method of following the context of the LCPS (Fig 4) artificially using superlanguage coordinates starting from the starting subject name, ② The method ① can be traced with a dedicated program Method

*FIG. 8C*

METHOD FOR ENABLING VERIFICATION OF LEGITIMACY OF AN ASYNCHRONOUS ALGORITHM GENERATED WHEN A LOGICALLY CONNECTED PROGRAM IS EXECUTED

TECHNICAL FIELD

The present invention relates to a method for identifying a syntax (bug syntax) of a source (LCPS) of a logically connected program that causes an illegitimate value by an asynchronous algorithm (NSA) generated when the logically connected program is executed.

BACKGROUND

U.S. Pat. No. 6,532,586; Japanese Patent No. 3133343; European Patent No. 0947916; "Lyee's Hypothetical World", "New Trends in Software Methodologies Tools and Techniques", 84 of Frontiers in Artificial Intelligence and Applications, pp. 3-22, IOS Press, September 2002, Fumio Negoro; "Program Revolution to Disabling Computer Viruses (LYEE)", Japanese Community Research Institute, October 2014, Fumio Negoro; and "Summary of LYEE Theory", [online], MT International Co., Ltd. [2019.09.12 Search]/<URL: https://mtiinc.jimdo.com/no190907/Summary of lyee theory/>, Fumio Negoro are documents disclosing LYEE theory for determining all sources (SFS) of Scenario Function (SF) that generates a synchronous algorithm (SA) at the time of execution. Further, Japanese Patent No. 5992079; Japanese Patent No. 6086977; U.S. Pat. No. 10,235,522; "Principle Model of Scenario Function", [online], MT International Co., Ltd. [2019.09.12 Search]/<URL: https://mtiinc.jimdo.com/no190907/Principle model of scenario function/>, Fumio Negoro; and "Overview of scenario function", [online], MT International Co., Ltd. [2019.09.12 Search]/<URL: https://mtiinc.jimdo.com/no190907/Overview of scenario function/>, Fumio Negoro are documents that disclose SFS.

The LYEE theory is a model of life function for determining SFS, where the smallest unit of meaning is a logical atom and its structure is "vector".

SUMMARY OF THE INVENTION (Method to Enable Legitimacy Diagnosis of NSA Generated by LCPS)

In the SF research course, in order to constantly maintain the legitimacy of the SA of the SF in the SA, a mechanism that enables legitimacy diagnosis of the asynchronous algorithm (NSA) generated by the LCPS was discussed. The required mechanism is the "LCPS super-language context" of the present invention.

Since the "activation parameter" described later, which is added to the LCPS in order to capture the super-language context of the LCPS, is information inherently provided in the SF, it is not necessary to import the activation parameter again in the SF. The super-language context of the LCPS of the present invention is consequently sought in relation to SF. This mechanism was adopted as a method for enabling SA to autonomously solve bug event problems and virus problems encountered by SA among SAs generated by SF at the time of execution, and was incorporated into SF. In parallel, the mechanism of the present invention was established as a method for determining whether the legitimacy of NSA generated in LCPS at the time of execution was successful or not. It is 2003.

Hereinafter, paragraphs labeled (1) to (10) show the knowledge according to the present invention, and the LCPS super-language context mechanism is shown in paragraph labeled (11) and thereafter. The procedure for deriving the LCPS super-language context from LCPS is detailed in the embodiment section.

(1) (LCPS, SFS)

The algorithm that the program generates at the time of execution includes NSA (asynchronous type) and SA (synchronous type). The latter was announced by the inventor in 1986, and the inventor reached the final version of the LYEE theory for SF and its source of static structure (SFS), which is a program that generates SA in 2008. While LCPS that generates NSA at the time of execution has a structure called a logical connection type, SFS results in a data connection type structure. SFS is the first and only static structure in the world in that it is the first SA in the world to generate at runtime. The SFS code has already been published (see "SFS Overview"). As described above, SFS is established based on the systematic LYEE theory, whereas LCPS, which is already popular as a traditional aspect, does not have a rationale like the systematic LYEE theory. The method of recognizing NSA and SA will be described later as respective defining methods.

(2) (Bug Syntax)

Here, the application algorithm (AA), LCPS, and SFS established as a program are collectively referred to as "AA". The syntax that causes the subject (final information) of the subject name of the syntax that inhibits the establishment of AA will be referred to as a bug syntax in the present invention as a result of the discussion. The storage area that holds the subject generated by the syntax is customarily specified for each syntax. In the study of LYEE theory, when analyzing LCPS analytically, in order to remove ambiguity, the information generated by the syntax is taken as the subject, and the storage area specified for each syntax holding the subject is taken as the subject name. The present invention follows this nomenclature. For example, when information generated at the time of AA generated by LCPS is a subject of a subject name, a syntax generates the subject of the subject name. If the NSA does not satisfy all of the sufficient conditions related to the syntax (necessary condition) for generating the subject, the syntax for generating the subject is defined as "bug syntax" in the present invention. Such subjects are collectively referred to as illegitimate values. From this point of view, for example, if virus information and bug information are regarded as the subject of the subject name of the syntax, the subject of the subject name is naturally an illegitimate value in the present invention.

In the present invention, "the subject of the subject name of the syntax becomes an illegitimate value" means that the NSA changes the syntax to a bug syntax. Every syntax is legitimate in that it has been compiled until the subject is indefinite. The illegitimate value that becomes the bug syntax of SF autonomously is caught by the overall effect of "subject vector" used for each subject name (syntax) in SF before the SA of SF affects other syntaxes. And it is autonomously reset and reproduced. On the other hand, the LCPS structure is logically connected, so that the subject vector cannot be used. Therefore, LCPS NSA cannot establish autonomy like SA.

(3) (Fate Defects of LCPS)

When analyzing LCPS, the ratio of the number of syntaxes occupied by AA is about 90% of LCPS (total) on average, and ordering at the time of implementation becomes indispensable for these syntaxes because of logical connection.

When analyzing SF, the ratio of the number of syntaxes occupied by AA is about 30% of SF (total). However, since the syntax of the SF is data combination, the order of the syntax at the time of implementation is unnecessary. In the process of establishing SA, whenever information that inhibits establishment of AA, for example, all unnecessary information (illegitimate values) including bug, virus information, etc. develops, SF captures them autonomously and autonomously establishes the system that eliminates them before the moment when they adversely affect AA.

It is impossible to request a mechanism like SA for LCPS. According to the inventor's verification, the remaining bug syntax candidates are about 30% of the number of bug syntaxes captured by the present invention. In other words, LCPS is a program that is running with this amount of bug syntax candidates.

(4) (Mechanism Enabling NSA Legitimacy Diagnosis)

The NSA legitimacy diagnosis is possible if all subject names succeed in establishing the context of the relationship between one subject name and the other subject names. However, it is not realistic to ask NSA for this mechanism. The story to be described here is a mechanism (LCPS super-language context) that enables legitimacy diagnosis for all subject names from LCPS. It is a story that makes the impossible possible.

(5) (Definition of SA and NSA)

The algorithm generated by LCPS at the time of execution is an algorithm for dividing all subject names belonging to LCPS into a plurality of subsets, each of which is a unit, logically covering those units, and capturing the subject of all subject names. This algorithm is called an asynchronous algorithm (NSA). The algorithm generated by the SF at the time of execution is an algorithm of a structure in which each of all subject names belonging to the SF are regarded as a single unit, and this unique unit is repeated until the subject of all subject names is established. This algorithm is called a synchronous algorithm (SA).

(6) (Subject Vector)

In order to capture SA, the "subject vector" is indispensable. The subject vector is found in LYEE theory and is a component of SF. See FIGS. 8 and 8A-8C.

(7) (Program Solution)

The solution of the program is an algorithm generated by the program at the time of execution, and is defined as a state in which the subjects of all subject names belonging to the program are established. This definition is made clear by the LYEE theory. According to this definition, the solution of LCPS is unknown, but the solution of SF exists. The SF solution is named "subject genealogy".

(8) (Role of Program Solution)

If a partial division of LCPS is regarded as a partial division of all subject names belonging to LCPS, partial division is possible. However, if the partial division is regarded as a partial division of the algorithm, the algorithm is established as the partial division is impossible, and thus this partial division is impossible. If the solution of the program is established, the algorithm can be partially divided. Usually, since the LCPS solution is not established, partial division of the LCPS algorithm is impossible. The success or failure of the solution of the program is a parameter for determining whether or not the algorithm can be partially divided. The bug event caused by LCPS NSA is caused by LCPS partialization problem caused by this problem. Even if the compilation is completed, it is impossible to grasp this cause by a traditional LCPS verification method that can only confirm the validity of the specification, which is a necessary condition of LCPS. Therefore, the bug event problem is practically left unresolved. Incidentally, in the SF with the solution of the program, the structural defect problem of the algorithm that is partialized is solved at the time of execution using the subject vector and the SA generated at the time of execution. This can be understood by taking a close look at the public view of the scenario function and the subject genealogy, both of which are published, that is the solution of the SF.

(9) (How to Establish the Application Algorithm (AA))

LCPS NSA establishes LCPS AA by logically connecting the subject of all subject names belonging to LCPS. The SF SA establishes the SF AA because the subject of all subject names belonging to the SF is established synchronously.

(10) (Difference Between SA AA and NSA AA)

SF AA establishes an algorithm for establishing legitimate AA while eliminating illegitimate values. On the other hand, LCPS AA is not inherently structured to establish an algorithm for establishing legitimate AA.

(11) (Harmonic Coordinates, Harmonic Context)

Harmonic coordinates are the execution order of syntax given to all LCPS syntax. Harmonic coordinates are the coordinate system defined in this study. The execution order of the syntax indicated by the dotted line in FIGS. 4A-4D is called the harmony context. What is important is that the super-language coordinates are established on the basis of a given harmonic context.

(12) (Super-Language Coordinates)

Super-language coordinates are two harmonic coordinate pairs (TCX1, TCX2) assigned to the subject name and variable subject name of the entire LCPS syntax.

TCX1 is the TCX of an area definition statement that defines an area that holds the subject of the subject name of the syntax. TCX2 is a TCX having a syntax for generating a subject. Therefore, when the subject is the subject of the subject name, TCX2 becomes the TCX of the syntax. When the subject is a variable subject name, its TCX2 is a TCX having a syntax in which the subject is the variable subject name.

(13) (Super-Language Context)

The starting subject name of the super-language context is the subject name of the syntax of LCPS, which belongs to LCPS and whose subject vector type is governed by L4 and W4, and whose syntax TCX is the smallest in the LCPS.

(b) The terminal subject names of the super-language context are all subject names of the syntax belonging to the LCPS and governed by the subject vector types R2 and L2.

(c) The LCPS super-language context is routes in which paths connecting subject name and variable subject name according to super-language coordinates converge from the terminal subject name to the starting subject name.

(d) The syntaxes other than the syntax to which the starting subject name belongs, and the syntax to which the terminal subject name belongs, are the nodes of the context connecting the terminal subject name and the starting subject name.

(e) The relationship between the super-language coordinate 1 and the super-language coordinate 2 on the side that accepts the super-language coordinate 1 (the side close to the starting subject name) is the same super-language coordinate even if the position coordinate TCX of the syntax is different.

(14) (FIGS. 2, 2A-2F, 3, 3A-3B, 4, 4A-4D and 5)

The information for establishing the LCPS super-language context that enables the legitimacy diagnosis of the LCPS NSA includes the LCPS information and the information that does not exist in LCPS to be obtained as the "activation parameter" from the SF information that establishes the SA.

In the present invention, this information is incorporated into LCPS so as not to inhibit LCPS. The format shown in FIGS. 2 and 2A-2F is determined as a device for governing this information. In the present invention, information in the format illustrated in FIGS. 2 and 2A-2F is named "LCPS super-language context information".

FIGS. 4 and 4A-4D shows the picture of FIGS. 2 and 2A-2F as illustrated. FIGS. 4A and 4A-4D is drawn from the information of FIGS. 2 and 2A-2F. Incidentally, FIGS. 4 and 4A-4D by free graphing tool can be automatically generated using the information of FIGS. 2 and 2A-2F as a parameter. The evaluation on the legitimacy of NSA and information on the bug syntax related to LCPS caused by NSA can be obtained in the form of FIGS. 3, 3A and 3B by preparing a dedicated program for analyzing FIGS. 2 and 2A-2F. FIGS. 4, 4A-4D and 5 are reference materials that contribute to determining the specifications of the dedicated program that performs the analysis of FIGS. 2 and 2A-2F.

(15) (Method of Identifying Legitimacy of NSA)

If the information shown in FIGS. 2 and 2A-2F in regard to 3, 3A and 3B cannot be extracted, the NSA generated when LCPS is executed is legitimate.

(16) (Cause of Changing the Syntax of LCPS to Bug Syntax)

If the super-language context of LCPS is used, the cause of changing the syntax to a bug syntax can be specified in the following two.

The existence of a syntax that causes breaks in the LCPS super-language context.

(b) Existence of a syntax that causes mistakes in the super-language context of LCPS.

That is, the cause (a) is a case where the syntax of the subject name to be accepted by the variable subject name of the syntax 1 does not exist on the LCPS super-language context. In this case, in the present invention, syntax 1 is called a syntax that breaks the context. Syntax 1 can be visually grasped because TCX2 of the super-language coordinate of the information in FIGS. 2 and 2A-2F is blank. This syntax 1 is particularly referred to as [data fluctuation syntax] (see FIGS. 3, 3A and 3B).

Cause (b) is the case where the correct subject name accepted by the variable subject name of Syntax 1 accepts a subject name that is not actually correct. The correct subject name is a subject name belonging to the syntax located on the past side immediately before the TCX of the starting point if the starting point is the TCX of the syntax to which the variable subject name 1 belongs. A subject name that is not correct is a case where a subject name of a syntax other than the correct subject name syntax is accepted.

For the syntax to which the subject name accepted by the syntax 1 of the cause (b) belongs, if a special program for analyzing FIGS. 2 and 2A-2F is not prepared and the syntax to which the subject name accepted by the syntax 1 belongs is not specified, the correctness of the context cannot be determined. It is impossible to capture the syntax of the cause (b) from the LCPS arithmetically unless he is too unusual. There is no reason to be able to specify this syntax with traditional LCPS verification methods.

The cause of misleading the syntax position of the cause (b) is an error in giving harmonic coordinates from the viewpoint of the present invention. Harmonic coordinates giving is a human task. And when an illusion arises there, cause (b) develops. The inventor made a compiler that overcomes this problem as a basic problem for establishing a smart compiler when he was teaching at a university, and presented it at the Information Processing Society of Japan. It is a story 50 years ago.

(17) (how to Identify Bug Syntax)

If the cause of the development of bug syntax in the LCPS can be identified by super-language context, the subject of the starting subject name will be an illegitimate value from the LCPS super-language context structure, even if the incorrect value is not specified by a specific value. It is obvious. And if the subject of the starting subject name becomes an illegitimate value, the syntax that uses the starting subject name under the starting subject name as a variable subject name will be affected, and will change to a syntax that causes a bug event. (See FIGS. 4, 4A-4D and 5). This means that the LCPS syntax that changes to the bug syntax can be specified without the LCPS being processed by the computer using the test data.

(18) (Bug Event Category)

In the super-language context of LCPS, a bug syntax develops in the contexts between the syntax positions of causes (a) and (b) and the syntax position to which the starting subject name belongs (see FIG. 5). If there is a conditional statement governed by one or more subject vectors L3 among these contexts, and the judgment of the conditional statement is influenced by the incorrect value of the subject of the starting subject name, the entire syntaxes between this conditional statement at the furthest position from the starting subject name and the syntax position of causes (a) and (b) is partially destroyed. The bug syntax accompanied by partial destruction is described as "2" in the bug event classification of FIGS. 3, 3A and 3B.

The bug syntax without partial destruction is marked as "1" in the bug event classification of FIGS. 3, 3A and 3B It is not easy to correct the bug syntax of bug event category 2 (see FIGS. 3, 3A, 3B and 5).

(19) (Reason for the Cause (b) Syntax)

It is NSA's work that the compiled LCPS syntax changes to a runtime bug syntax. This NSA work occurs for the following reasons. That is, the program solution is not established in LCPS. This suggests that LCPS at the time of execution causes the relationship between the part and the whole algorithm to be ambiguous (see FIG. 7).

And, when the same partial program of LCPS is used in multiple places, the operating conditions of the same partial program are not always the same. And although LCPS partial programs need to deal with this difference in terms of coding, these measures are not customarily taken. As a result, despite the fact that the syntax of the correct subject name that is accepted by the variable subject is not properly known, the thinking that cannot interpret as unknown provides harmonic coordinates in LCPS according to the rules. The syntax of the cause (b) in the previous section (16) is caused by such a background.

(20) (The Role of LCPS)

OS work is limited to improving program execution productivity. The following problems cannot be solved by the OS.

(A) LCPS productivity
(B) LCPS maintenance productivity
(C) Program language problem
(D) Compiler problem
(E) Eliminating bug syntax
(F) Elimination of viruses In SF, these issues are solved autonomously at the time of SF development work, especially (E) (F) when SF is executed. On the other hand, LCPS cannot solve any of these problems.

(21) (Subject Name Critical State)

In the course of the present inventor's research of SF and LYEE theory, the relationship between the number of subject names belonging to LCPS and the algorithm (NSA) generated when LCPS is executed is discussed. In this discussion, it was clarified that the cause ((16) described before) causing NSA mistakes occurs when the same noun is duplicated. In the present invention, a state where the same noun is used in duplicate is called a critical state of the subject name.

[LYEE Theory]

(1) (Infinite Phenomenon)

In the LYEE theory, it is hypothesized that when a life action recognizes, the life action accepts the "whole picture" for establishing legitimate recognition. In LYEE theory, this whole picture is called "infinite phenomenon". The LYEE theory is a research to capture this infinite phenomenon. This mechanism is called "consciousness function" in LYEE theory. A scenario function (SF) is a consciousness function in which the meaning of the consciousness function is transferred to terms in the program world.

(2) (Synchronization)

The mechanism that captures the whole picture of an infinite phenomenon is established as a mechanism that integrates parts to the limit. The part is a dynamic aspect, and the whole is an aspect in which the dynamic state has changed to static. In other words, integrating parts to the limit means synchronizing the dynamics of the part. This is because the synchronized aspect results in a static aspect. By the way, the program that is not synchronized is a part. Therefore, regardless of the number of syntaxes, the LCPS partial program and the entire LCPS are always parts.

That is, their aspect is dynamic. Therefore, in SF the solution of the program is specified, however, the solution of the LCPS program in which synchronization is not established remains unknown. The mechanism for integrating parts to the limit was determined by the LYEE theory. That is, a mechanism 1 (vector) that makes it possible to recognize the contents of an infinite phenomenon unit (fractal) and a mechanism 2 that synchronizes the entire set of the mechanism 1 were established. The infinite phenomenon unit has been replaced with the subject name. SF is a program of a structure for integrating LCPS to the limit.

(3) (Visualized Algorithm)

The "NSA panoramic view" visualized by the University of Laval is seen with a corn-type chaotic context, and the "SA panoramic view" is seen with an orderly and repeatable context.

(4) (Means to Catch Bug Events)

We copy the SA, which intrinsically establishes legitimacy, to the NSA and discuss the differences between them. The difference causes a bug event in NSA. It is inevitable that a bug event will occur in an NSA where legitimacy is not established. Needless to say, it is contradictory to try to catch the bug event with NSA. Unless a super-language context of LCPS is generated based on LCPS and analyzed, bug events cannot be captured. The super-language context of LCPS is the aspect of the final synchronous structure calculated from LCPS.

(5) (Principal Parameters for NSA Success/Failure Determination)

LCPS completeness is at the return goods level for products in other fields. And Business first principle of the IT industry hollows out technology of NSA. And, the hollowing out of intelligence (Conscience) appears as being endlessly accelerated. The present invention is a method for determining success or failure of NSA. From the nature of the algorithm, the traditional verification method for determining success or failure of the LCPS specification differs from the verification method of the present invention for the following reasons.

LCPS specification information is a part of necessary condition for determining LCPS procedures.

(ii) The LCPS algorithm is a dynamic aspect generated by the necessary conditions.

(iii) The algorithm does not hold in part.

(iv) The algorithm is the whole of sufficient conditions related to necessary conditions.

(v) The entire algorithm is specified when the program is executed.

(vi) The SF source structure captures the entire sufficient condition at the time of execution.

(vii) NSA is an algorithm generated by LCPS.

(viii) SA is an algorithm generated by SF.

(6) (Significance of 8 Items)

The 8 items related to the above algorithm suggest that the success or failure of NSA legitimacy cannot be judged sufficiently by the traditional verification method resulting in the specification verification method. In other words, no matter how much LCPS traditional verification methods are piled up, it does not lead to a complete legitimacy determination of NSA. Therefore, NSA defects can be clarified by investigating the operating NSA on the premise of this. It becomes clear that the AA established by the NSA is incomplete. As a result, it becomes clear that all LCPS are operating in an incomplete state. Therefore, the occurrence of system accidents in LCPS is an unavoidable necessity of LCPS. The LCPS NSA visualized at Laval University already mentioned is sufficient to suggest this.

(7)

The eight items of (5) above were obtained from information on the investigation and analysis of LCPS in operation during the inventor's research course for obtaining the static structure of SF. In 1986, inventor of this invention reached to realize that the essence of the program problem (the truth of the program) would not be reached unless the algorithm of the program was regarded as a life action. LYEE theory, and SF, were completed in 2008 as the goal of research started in 1972. During this time, a total of 1000 operating LCPS analyses were performed by the inventor. It is by the knowledge concerning LCPS obtained from this analysis information that LYEE theory and SF were completed. The present invention is based on SA of SF.

(8) (Cause of LCPS NSA Causing Bug Syntax)

The NSA generated is legitimate when an LCPS for which the compilation process has been completed is executed. And if the NSA is legitimate, the bug syntax does not develop. Therefore, in the SF, once the compiling process is completed, the traditional LCPS verification process that is performed on the LCPS is not necessary. In SF, if the compilation process is completed, the operation process can be started.

And the definition structure of SFS is designed so that a mechanism for capturing and eliminating unnecessary information is established autonomously in SA if unnecessary information develops during execution. However, it is impossible to request LCPS for an NSA that establishes such a mechanism.

In order to avoid this problem with LCPS, it is necessary to set an executable condition for each part where the partial program is used, and to determine whether the partial program can be used or not. Otherwise, the partial program can be defined but the algorithm is not valid. This executable condition requires a subject name other than the subject name belonging to the partial program. In order to solve such a problem, there is no partial program as in LCP in SF. A subject vector (see FIG. 9) defined for each subject name is used. And all these subject vectors solve this problem autonomously. For those who want to use conventional partial programs, these component programs may be set as the second rule of the subject vector. Setting an executable condition for a logically connected partial program is not practical in the absence of a person who understands this. This is not the same story as there is no AI engineer.

(9) (Mechanism to Change Legitimate Syntax to Bug Syntax)

The data for verifying the legitimacy of NSA is not the data (specification information) used in the traditional verification method that asks the success or failure of AA, but the executable LCPS that generates NSA. In the present invention, verifying NSA means capturing the aspect of NSA by using the entire syntax of LCPS. This aspect is referred to as a super-language context of LCPS in the present invention. FIGS. 2, 2A-2F or FIGS. 4, 4A-4D is information for super-language context obtained from LCPS.

The super-language context is the subject of the present invention. In conclusion, the present invention is a way to identify a syntax using super-language context for NSA that transforms the legitimate syntax of LCPS into a bug syntax. All the context paths of the super-language context, go ahead, but on the definition method of the context, as can be seen in FIGS. 4 and 4A-4D, start from the terminal subject name and converge to the starting subject name. If the existence of bug syntax is interpreted by using the super-language context, the bug syntax is a syntax that is turned to be so due to the interruption of the path of the super-language context.

LCPS has a bug syntax that breaks the context from the beginning, and a bug syntax that breaks the context during operation. The former is a childish error of a program. Such bug syntax can often be seen in LCPS with history of language conversion. Although the data generated by this bug syntax is an illegitimate value, the difference between the normal value and the illegitimate value is often small, so depending on the system, most of the participants and users overlook this phenomenon.

The cause of the discontinuity in the super-language context is due to the lack of recognition related to the above, except for the childish mistakes of the program described above. If the person concerned can recognize this insufficient recognition, the syntax for interrupting the context can be specified from FIGS. 2, 2A-2F or FIGS. 4, 4A-4D Then, all the bug syntax that originates in the syntax can be specified in the format of FIGS. 3, 3A and 3B.

(10) (Guideline for LCPS World to be Reborn)

If the traditional verification method of LCPS can be understood well, it is limited as much as measurement of the processing time of the system. If other significance is sought for this verification method, I would like to suggest to think what the program verification method should be, regardless of the traditional verification method. The present invention will guide new verification methods.

(11) (Diagnosis Object of the Present Invention)

In SF, the legitimacy of SA is guaranteed after compilation. Therefore, SA does not need the present invention. The diagnostic object of the present invention is to clarify the cause of NSA whose success or failure is unknown.

(12) (Principle Issues of LCPS)

Since SF is a data-connection program, the algorithm at the time of execution is SA. On the other hand, since LCPS is logically connection program, in other words, an artificial program, the algorithm at the time of execution is NSA. And even if you notice a program problem that NSA develops, you can't solve it on that LCPS or with another LCPS. As is clear with virus-compatible LCPS, we simply build up a rooftop of program problems. Since the NSA problem is caused by the structure problem of LCPS, a universal solution (solution without exception) cannot be achieved unless the structure of LCPS is changed.

(13) (about 30% Bug Syntax Continues to Exist)

According to the inventor's investigation, the ratio of remaining bugs is about 30% of the total. And if this remaining bug wakes up during operation, a system accident will occur. Since nobody understands the mechanism of the onset of this bug syntax after the accident, the parties are renovating the LCPS, which can only be repeated building up the rooftop as a result regarding a part of the mechanism to be the cause.

(14) (a Mechanism that Captures all Bug Syntaxes)

The present invention is a method for capturing all bug syntaxes by using the super-language context of LCPS.

(15) (Application Record of LYEE Theory)

SF development work to solve from unnecessary information at the time of execution can be performed in the meaning of the work amount by a programmer with a disposition (newcomer) that performs the work of the contents as specified in the course of study. For example, the 401K system is known to the public, but at the time of 2003, the present inventor had not yet granted permission to use SF, so newcomers delivered the program with about 2 million syntaxes using the LYEE theory in about 10 months. This was a typical example that best matched the expected SF productivity parameters (coding rate, testless rate, total work man-hours, work man-hour process distribution rate, work automation rate, development work difficulty, work difficulty). By the way, all the systems developed from 1993 to 2006 in the LYEE theory are 36 large ones.

(16) (LCPS Technical Issues)

If bug syntax does not occur during execution, legitimacy is established for NSA and LCPS. However, this is not possible with LCPS, although it depends on the scale of the system. According to the inventor's investigation, bug syntax has been found even in LCPS with 300 syntaxes in operation. However, LCPS is a fateful program that is a only method to be operated.

(Sufficient Conditions for LCPS)

The following are five points that summarize the causes of bug syntax.

(a) The solution for LCP is indefinite.

(b) As a result, the meaning of the part and the whole is ambiguous.

(c) Therefore, the rules for assigning the execution order of all LCPS syntax must not be definitive. This causes errors in the assigning no matter they are compilers or the human.

(d) An error coding of the execution order may cause an error in the assignment of "super-language coordinates".

(e) As a result, there will be a break in the "super-language context".

The above is the outline of the mechanism to change the syntax belonging to LCPS to bug syntax at the time of execution. In addition to the above (e) where the super-language context is interrupted, even if the super-language context is falsely established for the reason (d) above, it will be the ultimate cause of developing the bug syntax. In the above (e), if the information in FIGS. 2 and 2A-2F is analyzed in FIGS. 4 and 4A-4D, the position can be specified. The above (d) is a state that violates the super-language context generation rule. If you analyze the super-language context, you can catch that part.

The research that the present inventor has advanced from 1972 to 2008 is summarized as follows:

A study on the problem of asynchronous algorithms created by logically connected programs during execution, and (2) Study on Existence of Program (SF) for Solving the Above Problems.

Motivation of the Present Invention

The motivation of the present invention was to clarify the cause of a bug event caused by LCPS in the course of research for theoretically determining the static structure of a program (SF) that aims at the completeness of the program. Bug events were observed from 1986 to 2000. The causes are classified into (a) those associated with LCPS and (b) those whose cause is unknown. In the present invention, the bug event (a) is reflected in the bug event category 1 shown in FIGS. 3, 3A and 3B described later, and the bug event (b) is reflected in the bug event category 2 shown in FIGS. 3, 3A and 3B. Category 2 is a bug event accompanied by LCPS partial destruction, and category 1 is a bug event not accompanied by LCPS partial destruction. These are also reflected in FIGS. 3, 3A and 3B in the present invention.

(Cause of LCPS Causing Bug Syntax)

This research started in 1972, starting with "Warning of Soft Crisis". By the way, this warning was the notice that if the program size exceeds 1.5 million lines, no one can solve the so-called bug problem, and the programmer coding rate (the number of codes that the programmer can determine per day) reaches zero. By the way, it was from the beginning of 1990 that majority of people became to think the program development methodology for automatic programming to be unable to be expected because of the lack of research and program partial dividing was actively promoted though it was unfavorable in principle. This warning was behind it. And the partialization of programs which is not preferable in principle became a trend of the IT industry.

It is pointed out by the inventor that program partialization is not desirable in principle, because the definition of logically connected event partialization can be made by anyone because it is a partialization of all subject names belonging to the system. However, the success or failure of the algorithm generated by the partial program at the time of execution cannot always be determined by the algorithm generated by the partial program. There is no syntax rule in the grammatical rule of programming language that solves this success/failure problem. The success or failure of an algorithm can be evaluated only by all algorithms on account of the existence principle of the algorithm. Therefore, anyone can define the partialization, but it is not possible for anyone to define the partial program so that the partial algorithm is the whole (see FIG. 6). In other words, a partial program is defined with the same feeling as a part of a machine object without consideration for the existence of a program that is different from a machine object. A partial algorithm generates an algorithm as a legitimate algorithm that accompanies the mistake that cannot be noticed when a partial program is executed. A possible cause of changing the LCPS syntax to a bug syntax is this partial algorithm.

(The Present Invention has been Verified)

The present inventor has conducted proof verification using the idea of the present invention in order to capture a bug syntax that occurs when a control program composed of about 500,000 syntaxes is executed. The syntax changed to the bug syntax captured in this verification was one of the syntaxes belonging to the partial programs used in common at multiple places. The validity of the present invention is proved by this verification.

(Differences Between the Whole of Sufficient Conditions and the Super-Language Context of LCPS)

(1) (the Whole of Sufficient Conditions)

In order for, for example, a subject of subject name 1 of syntax 1 belonging to LCPS to be established at the time of execution, since all variable subject names related to subject name 1 become subject names of different syntaxes, before syntax 1 is executed, the subjects of these subject names must already be established. If the relationship that establishes the subject of the variable subject name reaches the subject that is the progenitor of the LCPS, this relationship is called the whole of sufficient condition for the legitimacy of the subject of subject name 1 to be established.

(2) (Part of Sufficient Condition)

Refer to relevant section.

(3) (how to Obtain FIGS. 2 and 2A-2F)

The information for capturing the phenomenon (2) above is "FIGS. 2 and 2A-2F".

(4) (how to Obtain FIGS. 4 and 4A-4D)

If the information in FIGS. 2 and 2A-2F is illustrated, FIGS. 4 and 4A-4D is obtained. FIGS. 4 and 4A-4D can be drawn manually from the information of FIGS. 2 and 2A-2F or by using a commercially available drawing tool using the information of FIGS. 2 and 2A-2F as a parameter.

(5) (how to Obtain FIGS. 3, 3A and 3B)

If the information in FIGS. 2 and 2A-2F is analyzed by a mechanical procedure, the information in FIGS. 3, 3A and 3B is obtained. This means that the information of FIGS. 3, 3A and 3B is obtained from FIGS. 2 and 2A-2F manually or a dedicated program that can be created.

(6) (The Whole of Sufficient Conditions for LCPS)

In order to determine the legitimacy of the subject of each subject name in all syntaxes belonging to the LCPS, it is necessary to grasp the whole of sufficient condition for the subject of the subject name for each subject name belonging to the LCPS. However, the logically connected LCPS does not have the information necessary to capture the whole of sufficient condition. In other words, it is impossible for LCPS to capture the whole of sufficient condition. In other words, this means that legitimacy verification at the time of LCPS execution is impossible in principle.

Incidentally, SF is designed as a structure that establishes a synchronous algorithm at the time of execution. Therefore, the SF has succeeded by this structure in capturing the whole of sufficient condition for the subject of subject name for each of all subject names and autonomously eliminating the subject that is not established, that is, the subject that has an illegitimate value.

In the present invention, a mechanism for capturing the LCPS bug syntax was discussed, the definition of the bug syntax causing the illegitimate value was clarified, and necessary information for capturing the bug syntax from the LCPS was defined.

Also, in the present invention, information essential for capturing the bug syntax is defined and added as the following activation parameters.

Subject name
Variable subject name
Subject vector
Syntax type
Multi-structured harmonic coordinates
Harmony context Super-language coordinates
Super-language context
Starting subject name
Terminal subject name The above information is collected in FIGS. 2 and 2A-2F. In order to understand the information in FIGS. 2 and 2A-2F, the starting subject name and the terminal subject name are obtained. And it succeeds in catching a bug syntax from the information of FIGS. 2 and 2A-2F LCPS context refers to the information in FIGS. 2 and 2A-2F. That is, the LCPS context is the only unique context obtained from FIGS. 2 and 2A-2F based on the overall structure of the whole of sufficient conditions. Then, when the context of LCPS is applied to LCPS, the application effect is that the illegitimate value together with the syntax information related to the illegitimate value as shown in FIGS. 3, 3A and 3B corresponding to FIGS. 2 and 2A-2F can be grasped. As a result, the traditional LCPS verification method remains a verification method that cannot give a complete dynamic guarantee of LCPS, whereas the context of LCPS can clarify all the information to give a complete dynamic guarantee of LCPS.

Solution to Problem

"LCPS super-language context" is a means to solve the problem. Here, the definition concept used for deriving "LCPS super-language context" from LCPS is shown below (see FIGS. 8 and 8A-8C).
  Synchronization algorithm (SA)
  (02) Asynchronous algorithm (NSA)
  (03) Solution of the program
  (04) Unsolved problem of LCPS
  (05) 11 types of syntax
  (06) Subject name
  (07) Variable subject name
  (08) Illegitimate value of subject in subject name
  (09) Bug syntax
  (10) Five types of subject vectors (L4, L2, L3, R2, W4)
  (11) Relationship between 11 types of syntax and 5 types of subject vectors
  (12) A part of the whole of sufficient condition for the subject of subject name
  (13) The whole of sufficient condition for the subject of subject name
  (14) LCPS super-language context
  (15) Starting subject name of the LCPS super-language context
  (16) Terminal subject name of LCPS super-language context
  (17) Harmonic coordinates and harmonic context
  (18) Super-language coordinates
  (19) Super-language context
  (20) LCPS activation parameters (harmonic coordinates, syntax type, subject name, variable subject name, subject vector type, super-language coordinates)
  (21) FIGS. 2 and 2A-2F
  (22) Data fluctuation syntax
  (23) Critical number of subject names
  (24) Mistakes in harmonic coordinates
  (25) Super-language context break syntax
  (26) Clerical mistakes in super-language context
  (27) Partial destruction of LCPS
  (28) Classification codes 1 and 2 of bug events
  (29) FIGS. 3, 3A and 3B
  (30) FIG. 7
  (31) Plain text method (Summary of Definition Concept)
1. (11 Types of Program Syntax)
  In the present invention, the program syntax is classified into the following 11 types of syntax.
  Area definition statement
  Arithmetic statement
  Conditional statement
  Judgment statement belonging to conditional statement
  Fixed value statement
  Translation statement
  Call statement
  GOTO statement
  Subject area replacement statement
  Input statement
  Output statement 2. (Subject Name, Variable Subject Name, Constant, Fixed Value)
  2.1: For example, in the arithmetic statement A=B+C, A is a subject name, and B and C are variable subject names.
  2.2: Subject name A and variable subject names B and C are all area names.
  2.3: The variable subject name B is the subject name in the algebraic expression of B=.
  2.4: Subject name A is a variable subject name when D=E+A.
  2.5: The subject is a materialized state of the area name.
  2.6: For example, A and B in the judgment statement belonging to conditional statement A=B are variable subject names.
  2.7: For example, in A=7, A is the subject name and 7 is the subject of A. In this case, 7 is described as "constant", "direct value", "constant value", or the like.
  2.8: A in A (XYZ) is the subject name, and the character string XYZ is the subject of A and is described as a fixed value. In this case, the character string XYZ is also written as "fixed".

3. (Subject Vector) (See FIG. 9)
  3.1: The subject vector is a mechanism that governs the syntax used in SF. This invention is the diversion. The subject vector corresponds to a part of LCPS, but its structure is positioned as the ultimate universal part found by LYEE theory. FIG. 9 shows the structure. The subject vector governs the governing syntax according to its second rule. The subject vectors are classified into five types according to the type of syntax to be governed.
  3.2: The subject vector that governs the input statement is expressed as (R2, subject name). This subject name is the subject name representing the input area. 2 of R2 indicates that the input statement is positioned in the past in the tense.
  3.3: The subject vector that governs the output statement is expressed as (W4, subject name). This subject name is the subject name representing the output area. 4 in W4 indicates that the output statement is positioned in the present tense.
  3.4: A subject vector that governs a syntax represented by an arithmetic statement is expressed as (L4, subject name). This subject name refers to the subject name on the left side of the arithmetic expression.
  3.5: The subject vector governing the fixed value formula is expressed as (L2, subject name). This subject name is a subject name of fixed value. If this subject name does not exist, a fixed value is written directly. 2 of L2 indicates that the fixed value formula is positioned in the past in the tense.
  3.6: A subject vector that governs a conditional statement including a judgment statement is expressed as (L3, subject name). This subject name is given based on the subject names of (L4, subject name), (W4, subject name), (R2, subject name) and (L2, subject name) controlled by L3. 3 of L3 indicates that the conditional statement is positioned in the future in the tense.

3.7: The subject names of the subject vectors L4 and W4 are the candidates for starting point of the super-language context.

3.8: Subject vectors L4, W4, and L3 other than the starting subject vector are nodes on the context.

3.9: Subject vectors L2 and R2 are the end of the context.

3.10: The conditional statement governed by the second rule of the subject vector is governed by harmonic coordinates (TCY, TCZ1, 2, 3, 4).

3.11: Verbal tense is a so-called verb attribute concept, so nouns have no tense. However, nouns imply verbality in the background in materialization. Since the materialized subject name is referred to as the subject in this invention, the subject name is considered to have a tense. For this reason, the subject vector gives a tense to the materialized subject name of the syntax. This is because this is an inevitable measure in the SF in which the synchronization state of the subjects established by the materialization is the existence of the program. This is because subjects with different tenses need to be distinguished in the synchronization aspect of the subjects. This is because the subject of the input noun as well as the subject of the output noun and the subjects to establish the synchronized aspect must be distinguished. This principle is also necessary to specify the syntax to break the context when the illegitimate value of the subject of LCPS is captured using the context of LCPS.

3.12: An activation parameter is the following information that imparts dynamics to the LCPS. That is, subject name, variable subject name, harmonic coordinates, super-language coordinates, 11 types of syntax, and 5 types of subject vectors (see FIGS. 2 and 2A-2B).

4. (The Whole of Sufficient Conditions for LCPS)

The whole of the sufficient conditions of LCPS can be grasped based on the dynamic aspect of LCPS at the time of execution.

4.1 (Part of Sufficient Conditions for LCPS)

The part of sufficient conditions of LCPS can be grasped by the static of LCPS at the time of execution.

4.2: (Existence of Super-Language Context of LCPS)

LCPS super-language context is a mechanism to capture the whole of sufficient conditions of LCPS.

4.3: (Information in FIGS. 2 and 2A-2F)

Information 1 in FIGS. 2 and 2A-2F obtained from LCPS is information for capturing the super-language context of LCPS. Therefore, an activation parameter is imposed on the LCPS for the information of FIGS. 2 and 2A-2F.

5. (Harmonic Coordinates)

5.1: Harmonic coordinates are six types of coordinate systems conceived by the present inventor. The six types of coordinates are TCX, TCY, TCZ1, TCZ2, TCZ3, and TCZ4.

5.2: In the present invention, a set of harmonic coordinate systems is assigned to all syntaxes of all LCPS.

5.3: The meanings of the six types of harmonic coordinates are described below.

(1) TCX indicates the position of the syntax on the program as a continuous natural number starting from 1.

(2) TCY indicates the position of the TCX of the syntax to be executed next when viewed from the TCX syntax.

(3) TCZ1 indicates the TCX position of the syntax to be executed when true of true/false is established in the TCX syntax as viewed from the TCX syntax.

(4) TCZ2 indicates the TCX position of the syntax to be executed when false of true/false is established in the TCX syntax as viewed from the TCX syntax.

(5) TCZ3 indicates the TCX of the syntax located at the end point of the true/false evaluation of the TCX syntax as viewed from the TCX syntax.

(6) TCZ4 indicates the TCX of the syntax positioned next to the end point of the true/false evaluation of the TCX syntax as viewed from the TCX syntax.

6. (Super-Language Coordinates)

Refer to the super-language context of LCPS.

7. (Additional Note for the Whole of Sufficient Conditions for LCPS)

7.1: For example, in the arithmetic expression A=B+C, in this invention, A is a subject name, and B and C are variable subject names. The subject name and the variable subject name are both names of area (area names). In the present invention, A on the left side of the arithmetic expression is generally referred to as a subject name. Therefore, B and C have nature that can be a subject name in another arithmetic expression.

7.2: In this invention, the substance of the area name is collectively referred to as the subject. When it is necessary to assume the subject of the area name, the area definition statement TCX is given after the subject name. The meaning of A=B+C is A (TCX)=B (TCX)+C (TCX).

7.3: Subject name A ( ) is established when the subject of variable subject names B ( ) and C ( ) has already been established and the conditions permitting the calculation of A ( ) are satisfied. If the condition is X ( )=Y ( )×0 and Y ( ) have already been established, and if X ( )=Y ( ), the calculation (+) of A ( ) is allowed. That is, A ( ) is established when B ( ), C ( ) and X ( ) and Y ( ) satisfying X ( )=Y ( ) are established. However, these are only part of sufficient conditions for A ( ) to be established. This is because it is not sufficient to determine whether A ( ) can be established only by B ( ), C ( ), X ( ), Y ( ).

7.4: Unless these subject names further advance in the context and all the contexts are completed, that is, the subject name of the syntax at the end of the context is reached, the establishment of A ( ) cannot be guaranteed. This is indispensable especially for logically connected programs, i.e. LCPS. In other words, the context that can be traced to such extent is the whole of sufficient condition of A ( ).

7.5: The terminal syntax is a READ statement and a fixed value statement.

8. (LCPS Super-Language Context)

8.1: The LCPS context refers to the information in FIGS. 2 and 2A-2F 8.2: FIGS. 4 and 4A-4D is a pictorial representation of the information in FIGS. 2 and 2A-2F. FIGS. 4 and 4A-4D is sketched by the present inventor from the information of FIGS. 2 and 2A-2F.

8.3: The LCPS context is composed of (1) harmonic context and (2) super-language context, as is clear from FIGS. 4 and 4A-4D. However, when simply referring to the context of LCPS, it refers to the super-language context.

8.4: Harmonic context is a context of syntax for indicating the execution order of all LCPS syntaxes using harmonic coordinates (see dotted arrows in FIGS. 4 and 4A-4D).

8.5: Super-language context is a context that connects the same subject name in TCX2 of the super-language coordinates given to the subject name and the variable subject name of the syntax belonging to LCPS toward the variable subject name. They are solid arrow lines of FIGS. 4 and 4A-4D.

8.6: Super-language coordinates are a pair of coordinates (TCX1, TCX2) assigned to the subject name and the variable subject name of the entire syntaxes. TCX1 is the harmonic coordinate TCX of the area definition statement that defines the area of the subject name and variable subject name. TCX2 is a TCX having a syntax for establishing a subject (value) in an area indicated by TCX1.

8.7: The starting subject name in the super-language context is the subject name of the syntax governed by the second rule of subject vector L4 or W4 with the smallest TCX in the harmonic coordinate given to all LCPS syntaxes 8.8: Similarly, the terminal subject name in the super-language context is the subject name of the input syntax governed by the second rule of the subject vector R2, and the subject name of constant statement governed by the second rule of the subject vector L2.

8.9: Syntaxes other than the starting and terminal syntaxes in the super-language context plays the role of the node of the super-language context that connects the starting and terminal syntaxes (see FIGS. 4 and 4A-4D).

8.10: Super-language coordinates are TCX pairs. The TCX of the syntax 2 that materializes the variable subject name in the above 7 must be located at the closest possible position of the syntax 1 and in the past (refer to the information in FIGS. 2 and 2A-2F and FIGS. 4 and 4A-4D for details).

8.11: The super-language context is arrows connecting from the subject name that materializes the variable subject name toward the variable subject name (see FIGS. 4 and 4A-4D).

8.12: The context of LCPS is a mechanism that includes the whole of the sufficient conditions for syntax and captures the whole of sufficient conditions for LCPS. This is why there is only one starting subject name in the context of LCPS (see FIGS. 4 and 4A-4D).

8.13: The harmonic context of LCPS is edited for one LCPS. And the execution order is given to all the syntax belonging to this LCPS based on the harmonic coordinates. The harmonic context of LCPS is the execution order by this TCX (refer to the dotted line in FIGS. 4 and 4A-4D).

8.14: Based on the harmonic context, super-language coordinates are assigned to the subject name and variable subject name of all syntaxes.

8.15: If there is no syntax that becomes a node in the process of reaching the terminal of the super-language context, the path of the super-language context is interrupted. That is, a syntax that does not have a node syntax is regarded as a discontinuity of the super-language context, and the TCX of the syntax is written in the left column of information 3 in FIGS. 3, 3A and 3B This syntax can be seen in Information 1 of FIGS. 2 and 2A-2F, FIGS. 4 and 4A-4D and FIG. 5.

8.16: The syntax that causes the discontinuity of the super-language context is created by the disorder of TCX and the disorder of the super-language coordinates caused by the fatal structural defect of LCPS. However, it is impossible for LCPS creators to capture and recognize this mechanism inhibiting LCPS in advance by a conventional verification method. A system built with LCPS as parts is like a Babel tower. In the world where such a system prevails, this mechanism that lives in LCPS will definitely start to wake up in the future.

8.17: It is considered that there is essentially no syntax that breaks the super-language context. However, whatever the idea, if it exists, the subject of the subject name of the syntax that is the starting point of the super-language context is an illegitimate value. In this invention, this starting subject name in this case is described as the cause of the bug, and the TCX is written in the right column of the information 3 in FIGS. 3, 3A and 3B. Since the subject of the subject name of the syntax having the subject name of the starting syntax as the variable subject name is also an illegitimate value, the TCX of such a syntax is shown as a syntax causing a bug event in the left column of information 4 of FIGS. 3, 3A and 3B.

8.18: The super-language context can be traced from the starting subject name using FIGS. 2 and 2A-2F. If there is a syntax that breaks the super-language context in this process, it can be captured. Incidentally, the syntax that causes data fluctuation is a syntax that breaks the super-language context. This syntax can be found in the information of FIGS. 2 and 2A-2F. The TCXs of these syntaxes are written in the information 6 of FIGS. 3, 3A and 3B.

8.19: The correction of illegitimate values in the syntax of category 1 of bug events can be conducted legitimately by engineers who know the manners. The handling in the case of the bug event category 2 is impossible if it is not known what the bug event is.

8.20: There is a reality that LCPS is created by people who do not know the problem of illegitimate values. In addition, LCPS has a structural defect that operation can be continued even if such syntax is included. The LCPS context of the present invention can reveal the existence of such a syntax.

9. (Summary of Plain Text Method)

The summary of the work procedure of the method generically called "plain text method", is described below (see FIGS. 1 and 1A-1D).

9.1: Generate the information of FIGS. 2 and 2A-2F from LCPS.

9.2: Determine according to definition rule the only one subject name that will be the starting point of the context from the information shown in FIGS. 2 and 2A-2F.

9.3: Determine according to definition rule all subject names that are terminal of the context from the information in FIGS. 2 and 2A-2F.

9.4: Trace reversely the super-language context from the starting subject name and search for the syntax that becomes the breakpoint of the context. If there is a syntax that becomes a break in the context, the legitimacy of the context is not established.

9.5: When the legitimacy of the context is not established, the subject name that is the starting point of the context becomes cause of bug.

9.6: If the syntaxes of the context in which the subject name of the syntax causing the bug becomes the variable subjects are extracted from the information in FIGS. 2 and 2A-2F, they are bug syntaxes that becomes a bug event.

9.7: If the syntax exists according to the data fluctuation definition in the information in FIGS. 2 and 2A-2F, it is the data fluctuation syntax.

9.8: Determine the information 2, 3, 4, 5, 6 in FIGS. 3, 3A and 3B from the information in FIGS. 2 and 2A-2F according to the respective rules.

9.9: Edit the information for drawing FIGS. 4 and 4A-4D from the information of FIGS. 2 and 2A-2F.

(Supplementary Explanation of the Figures)

The following is a supplementary explanation of the figures.

(Supplement to FIGS. 1 and 1A-1D)

Plain text method is a general term for mechanical work procedures for generating output side information from input side information.

Plain text method 9.4 can be replaced with a graphing tool.

FIGS. 2 and 2A-2F shows parameter information for drawing FIGS. 4 and 4A-4D. FIG. 7 shows parameter information for deriving super-language context from the starting subject name.

(Addition of Plain Text Method)

Plain text method 1 is a mechanical procedure for generating FIGS. 2 and 2A-2F from two types of input side information: 1. LCPS and 2. seven types of LCPS activation parameters.

The plain text method 2 is a mechanical procedure for editing the information shown in FIGS. 2, 2A-2F, 3, 3A, 3B, 4, 4A-4D, and 5 to 7 and capturing the information 3, 4 and 5 shown in FIGS. 3A, 3B and 3C.

FIG. 7 shows parameter information for tracing the super-language context from the starting subject name of LCPS. FIGS. 2 and 2A-2F shows parameter information for deriving the two types of contexts, that is, harmonic context and super-language context, shown in FIGS. 4 and 4A-4D.

Plain text method 3 is a mechanical procedure for obtaining the information 6, 7, 8, 9 in FIGS. 1 and 1A-1D from the super-language context information in FIG. 7.

Plain text method 4 is a mechanical procedure for drawing FIGS. 4 and 4A-4D from the information of FIGS. 2 and 2A-2F.

(Supplement to FIG. 6)

11. If there is a syntax that causes a break in the super-language context, the subject of the subject name of the starting syntax does not satisfy the whole of sufficient condition, so that the subject of the starting subject name is an illegitimate value as a result.

12. The presence condition of the discontinuous syntax is a syntax in super-language context that maximizes the number of syntaxes having the subject of the subject name of the starting syntax as the variable subject (see FIG. 6).

13. The subject of the subject name of the syntax determined by above 12 is an illegitimate value as a result.

14. If the LCPS context of the present invention is used, the verification of the subject of the subject name does not require the actual value. This is a fundamental difference from the conventional verification method with execution using test data.

(Supplement to FIGS. 2 and 2A-2F)

Information 1: Information for capturing the "LCPS context" generated from LCPS by imposing seven types of activation parameters.

(Supplement to FIGS. 3, 3A and 3B)

Information 2: TCX of the starting subject name and the terminal subject name of the "LCPS context". It is obtained from information 1.

Information 3: TCX of information derived from "LCPS context".

Information 4: TCX of information derived from "LCPS context".

Information 5: TCX of information derived from "LCPS context".

Information 6: TCX of information derived from information 1.

(Supplement to FIGS. 4 and 4A-4B)

(1) The information in FIGS. 2 and 2A-2F and FIG. 7 is a parameter when the LCPS context is graphically expressed with a graphing tool.

(2) FIGS. 4 and 4A-4D illustrates the context of an LCPS example. Although FIGS. 4 and 4A-4D is drawn as defined in the context of LCPS, not all super-language coordinates are shown so that the outline of the figure can be easily understood. I dared to omit it. In FIGS. 4 and 4A-4D, three data fluctuating points appear. This is because the LCPS part is extracted for easy understanding of the concept of the context of the LCPS example. In fact, the number of data fluctuations captured by the inventor of the present invention is three in 25 years of research. In the LCPS of this example, only data fluctuation (information 6 in FIGS. 3, 3A and 3B) has developed. The left column of information 3 and information 4 in FIGS. 3, 3A and 3B is blank.

(3) The dotted line is a harmonic context. A harmonic context is established if the entire execution syntaxes of LCPS is covered.

(4) The solid line is the super-language context. The super-language context captures the relation of establishment of subject names or variable subject names.

(5) For example, F on the left side of F=R−F is called a subject name F.

(6) R and F on the right side are called variable subject names R and F.

(7) The super-language context of the variable subject B is not established on account of "?" in the figure. The subject value of variable subject B is undefined. Therefore, the subsequent execution syntax will not be established. This is considered to be a partial destruction of the program (bug event 2).

(Supplement to FIG. 7)

1. Entire syntaxes of LCPS with super-language coordinates (including area definition statement): Copy FIGS. 2 and 2A-2F.
2. Subject name of the syntax
3. Variable subject name in the syntax
4. A subject name that establishes a super-language context starting from a variable subject name is referred to as a context subject name (see FIGS. 4 and 4A-4D).
5. If the super-language context reaches the terminal, this super-language context is established.
6. If the super-language context does not reach the terminal, the super-language context is connected using this figure.
7. If the subject name connecting the super-language context is not found, the super-language context is interrupted.
8. The TCX of the execution syntax is registered in the left column of information 3 in FIGS. 3, 3A and 3B.

(Supplement to FIGS. 8 and 8A-8C)

The following information is necessary to determine the starting subject name in the context of the subject name for 2 in FIGS. 8 and 8A-8C.

1: Harmonic coordinates
2: Super-language coordinates
3: Syntax type
4: Relationship between syntax type and subject vector (Supplement to FIG. 9)

The subject vector is one of the parameters that capture the LCPS dynamic algorithm. The concept of the subject vector is published in the summary of LYEE theory. An example of the subject vector program is published in the SF learning guidelines.

1 sentence of the 1st rule "Is the 4th area already established?" is a proposition to determine the structure of the vector.

The second and third rules are indispensable for establishing synchronization with all vectors.

The 5th rule is the rule for predicting the extent to which life effects can be made. Incidentally, in the scenario function, this rule is a mechanism that predicts using a stack of substances (subjects). A program established on the premise of this rule is AI. The prediction mechanism based on vectors is important.

The memory in the 4th rule is indispensable to establish the third rule for all vectors.

The 5th, 6th and 7th rules are indispensable for the 3rd rule that is possible.

Aim of the Invention

The present invention is a verification method that replaces the traditional verification method of LCPS. Using the LCPS context (see FIGS. 4 and 4A-4D) obtained from the LCPS by a mechanical procedure, the operator should capture on the desk the syntaxes which establish an illegitimate value that does not conform to the intention of the LCPS in terms of the subject name of the syntax due to a fatal structural defect in the LCPS at the time of execution, if this worker receives instructions on how to work for the context of LCPS without requiring knowledge of LCPS as in the conventional verification method. The worker's work procedure can be made into a tool.

Mechanism of Invention

The present invention is a method of specifying in the format of FIGS. 3, 3A and 3B, using the information (FIGS. 2 and 2A-2F) that establishes the LCPS super-language context and is obtained by editing the LCPS, the syntaxes that causes an illegitimate value that does not conform to the intent of LCPS and the syntaxes related to the illegitimate value of the prior syntaxes.

Significance of the Present Invention

The "content of FIG. 2" (see FIGS. 2 and 2A-2F) mechanically obtained from the LCPS of the present invention, or "the context of LCPS" (see FIGS. 4 and 4A-4D) equivalent to this content is used as a mechanism for capturing the syntax that causes illegitimacy in the subject name of the syntax when the LCPS is executed. This is an application of a mechanism that captures the whole of sufficient conditions of LCPS. And the whole of the sufficient conditions of LCPS is the aspect at the time of execution of LCPS. So, this is the aspect that no one has ever caught. Although the order is reversed, the program that makes this observable with a dynamic algorithm is SF. FIGS. 4 and 4A-4D and FIGS. 2 and 2A-2F of the present invention show this specifically.

The reason why the relationship between the whole LCPS and its parts is ambiguous is that the LCPS solution cannot be obtained. Therefore, in the context of LCPS, it is required to give a set of harmonic coordinates to the entire LCPS. And the syntax which becomes the start of the context of LCPS is selected based on the rule of context from LCPS.

This ambiguity of LCPS is causing ambiguity, in other words, an unintentional and common errors, in assignment of harmonic coordinates by LCPS officials. As a result, this causes a syntax that causes breaks in the context of LCPS. The existence of this syntax is difficult to be explained by the empirical knowledge of LCPS developers.

BRIEF DESCRIPTION OF THE DRAWINGS

FIG. 2 shows exemplary information for capturing the super-language context of LCPS.

FIGS. 2A-2F show enlarged portions of the exemplary information of FIG. 2.

FIG. 3 shows exemplary LCPS analysis information captured from FIG. 2.

FIGS. 3A and 3B show enlarged portions of the exemplary LCPS analysis information of FIG. 3

FIGS. 4A-4D show enlarged portions of the exemplary diagrammatic aspects of FIG. 4

Figure 8:
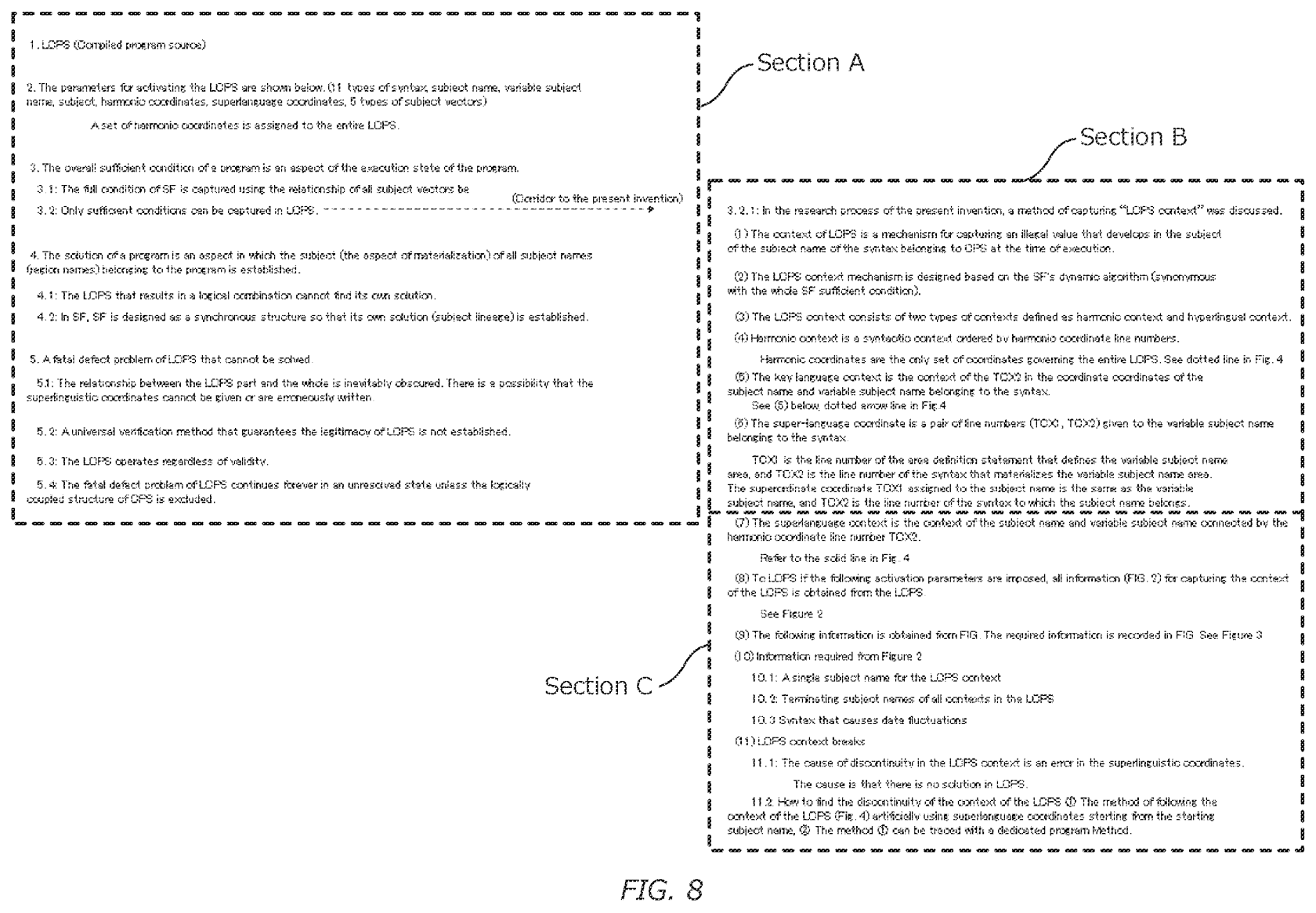

FIG. 8 shows definition concept regarding the present invention.

FIGS. 8A-8C show enlarged portions of the definition concept of FIG. 8.

DETAILED DESCRIPTION

The program targeted by the present invention is a compiled executable logically connected program source (LCPS) that generates an entire asynchronous algorithm (NSA) during execution.

The present invention is a method of generating information for establishing "LCPS super-language context" from the above LCPS in the format of FIGS. 2 and 2A-2F. The definition of the super-language context of LCPS is given in the corresponding section.

The super-language context of LCPS is a mechanism for determining the success or failure of the asynchronous algorithm (NSA) generated by the LCPS mentioned above during execution.

Figure 1:
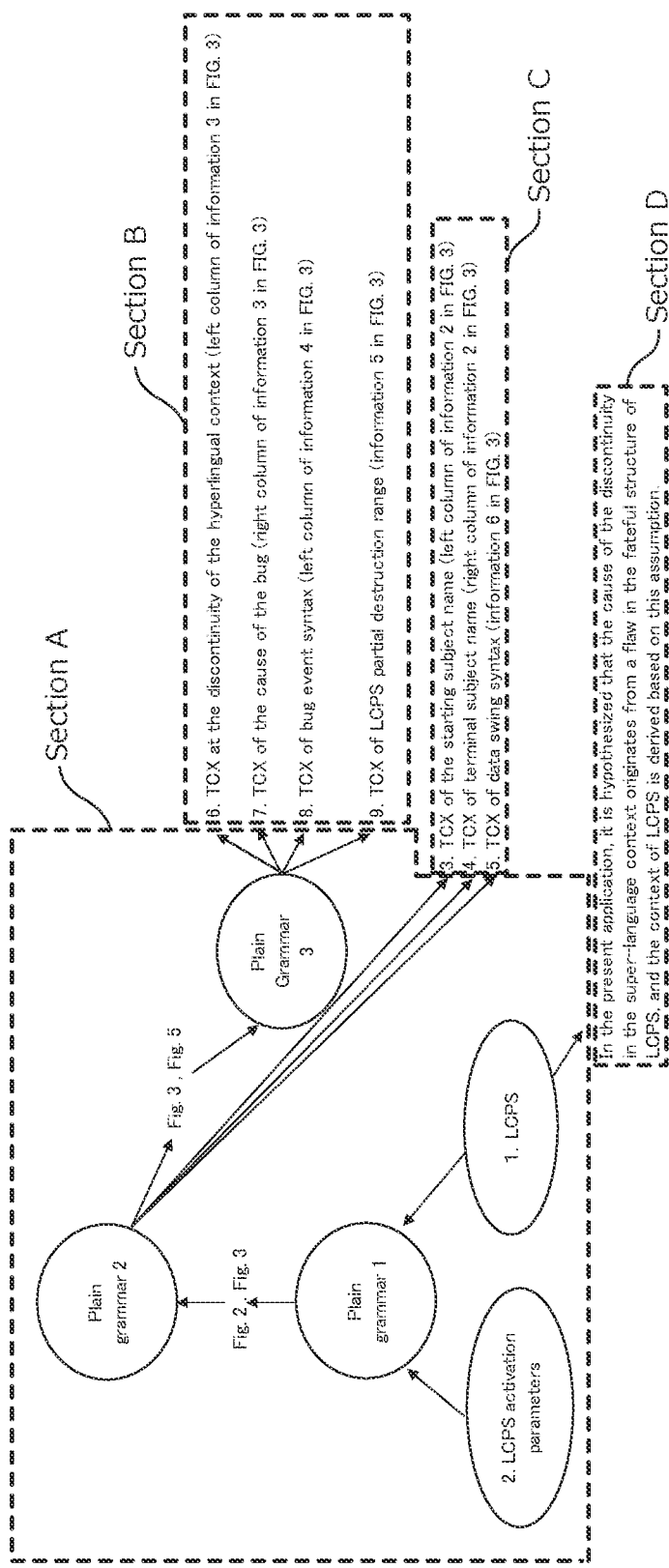
FIG. 1 shows a conceptual diagram of the present invention.
Figure 1A:
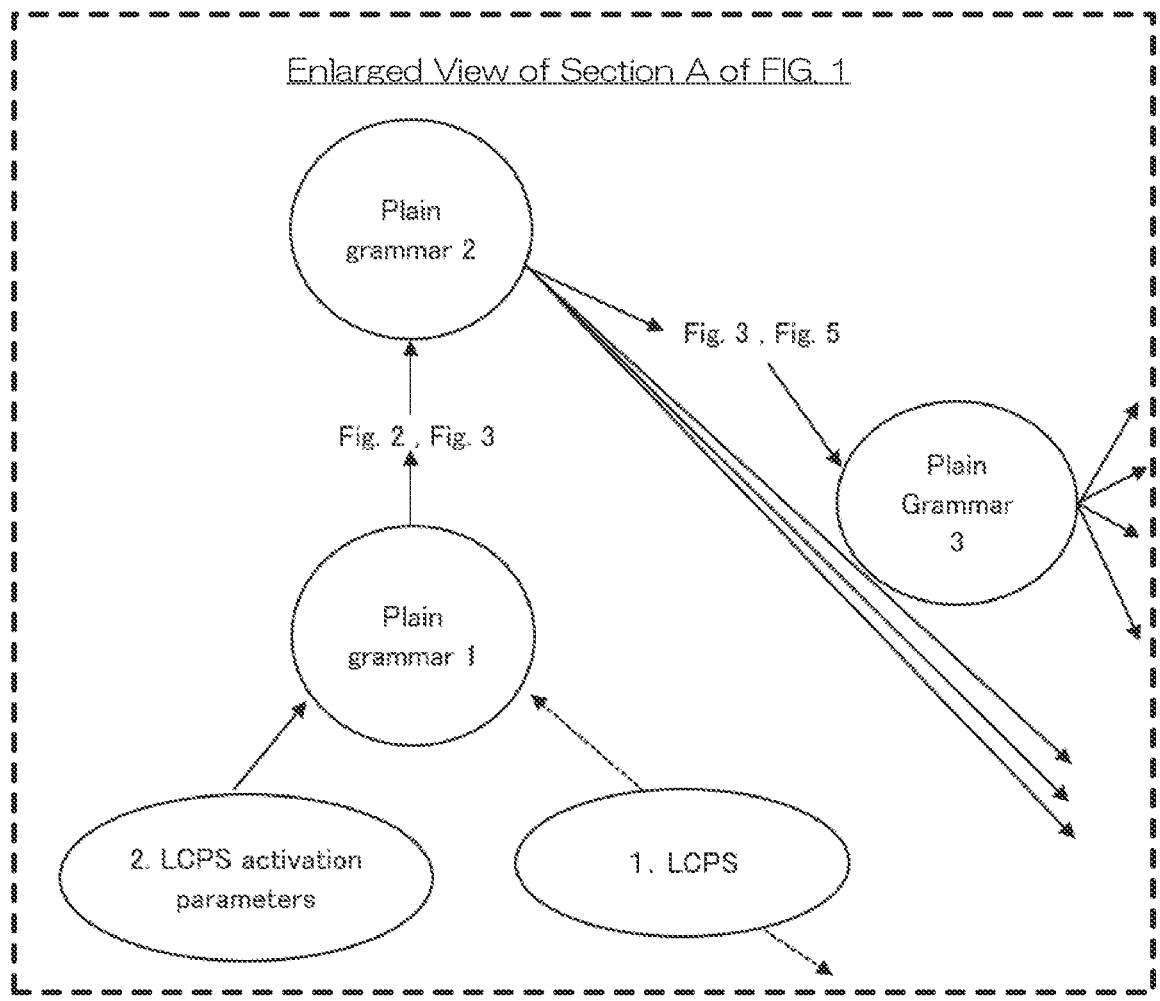
FIGS. 1A-1D show enlarged portions of the conceptual diagram of FIG. 1.
Figure 1B:
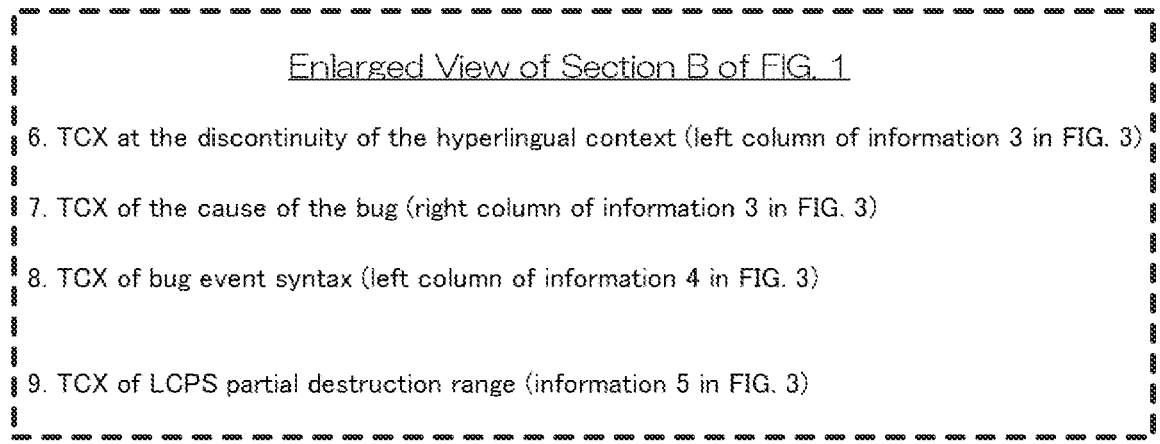
Figure 1C:
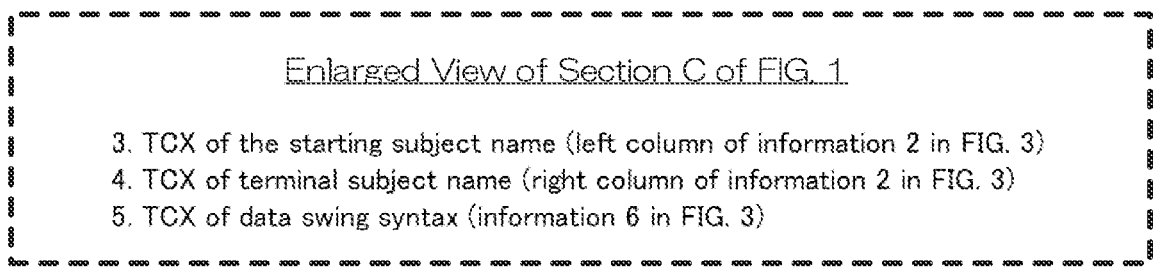
Figure 1D:
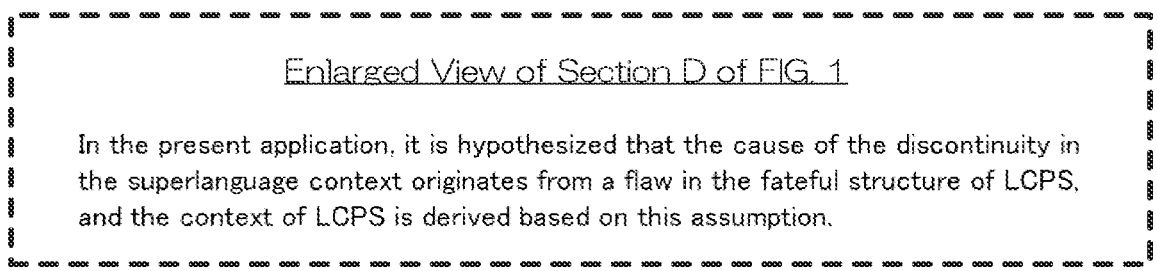
Figure 4:
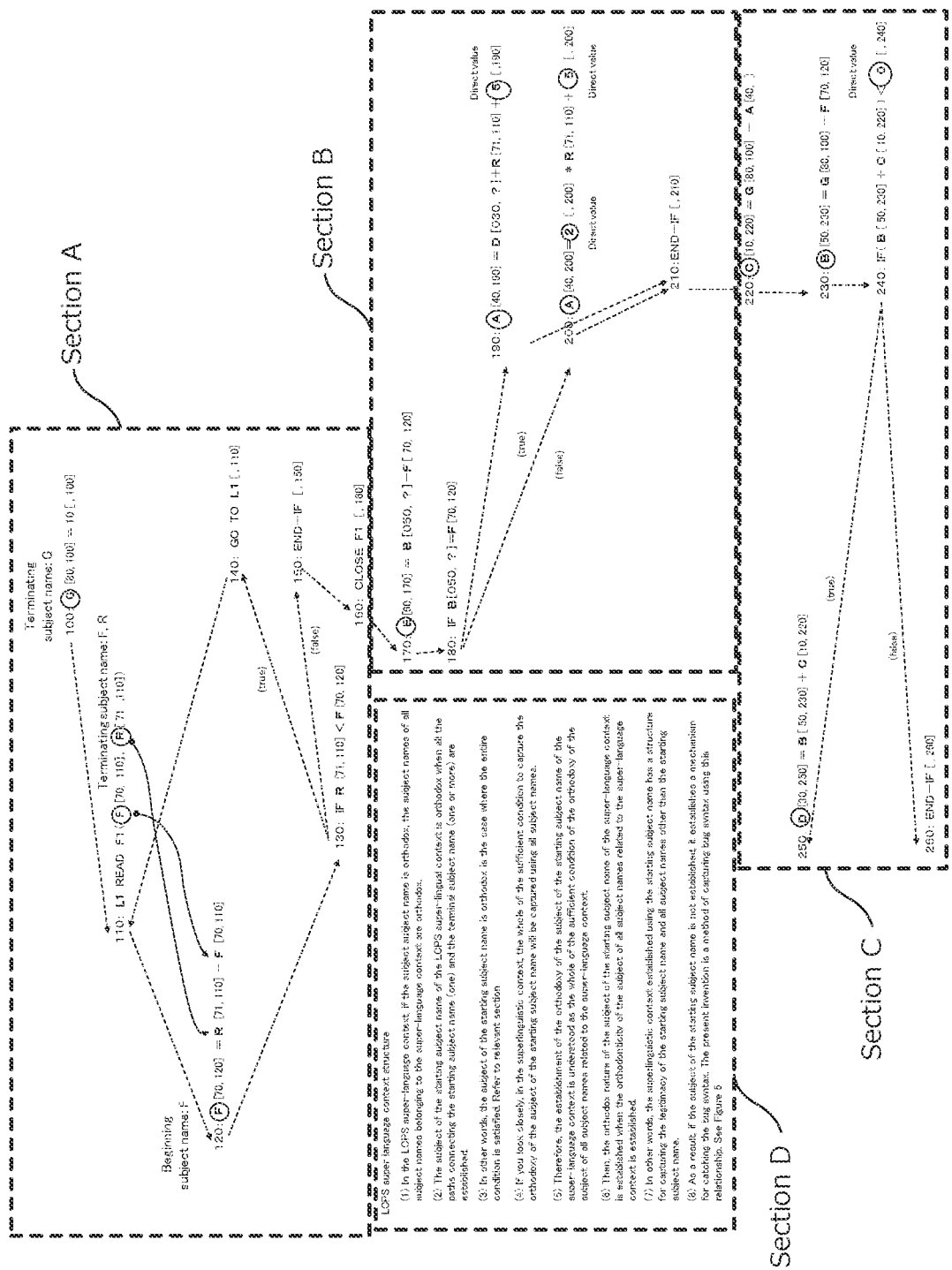
FIG. 4 shows exemplary diagrammatic aspects of FIG. 2.
Figure 4A:
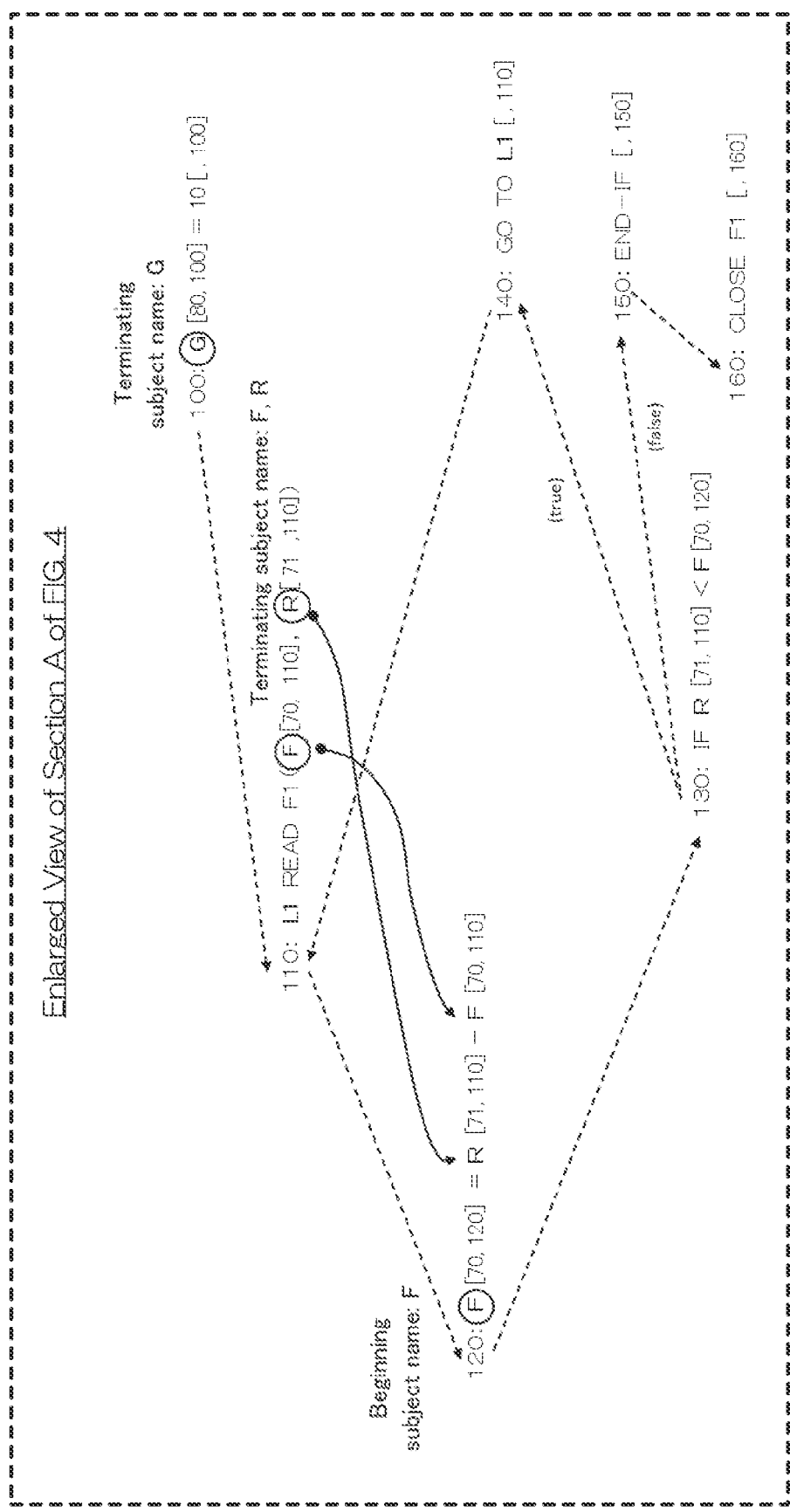
Figure 4C:
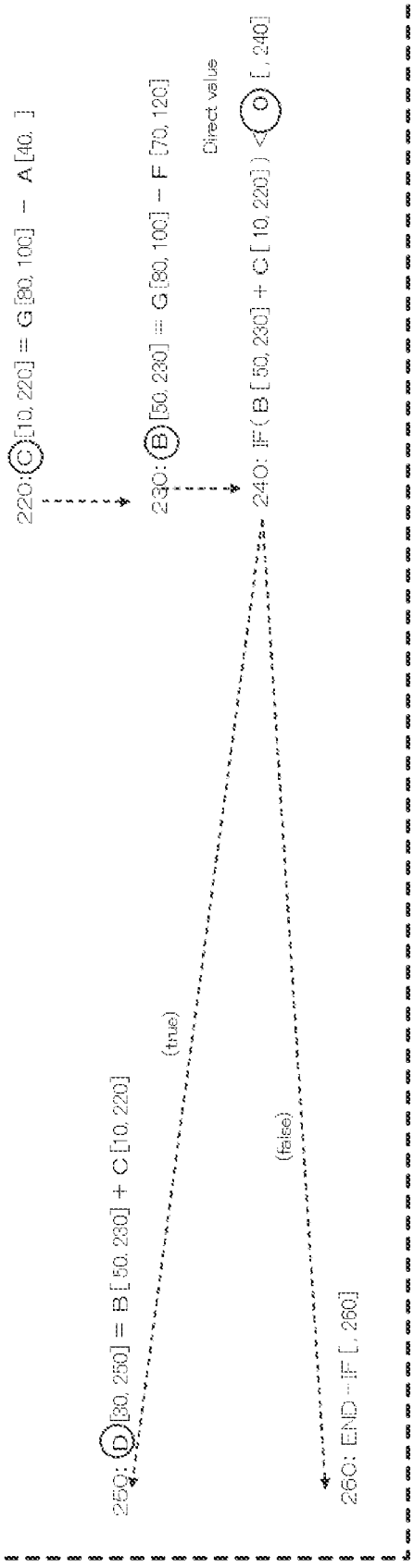
Figure 5:
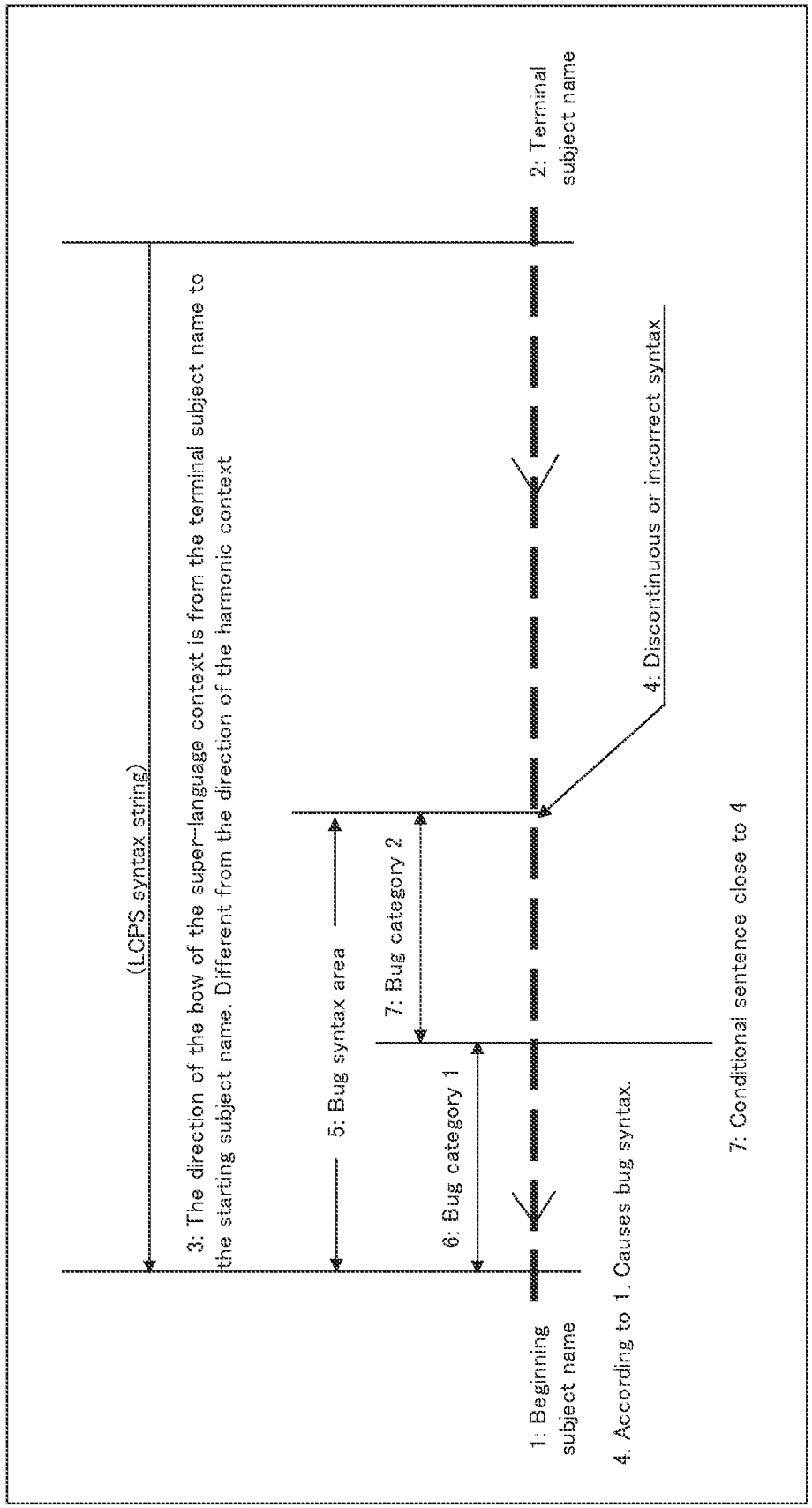
FIG. 5 shows concept related to super-language context.
Figure 6:
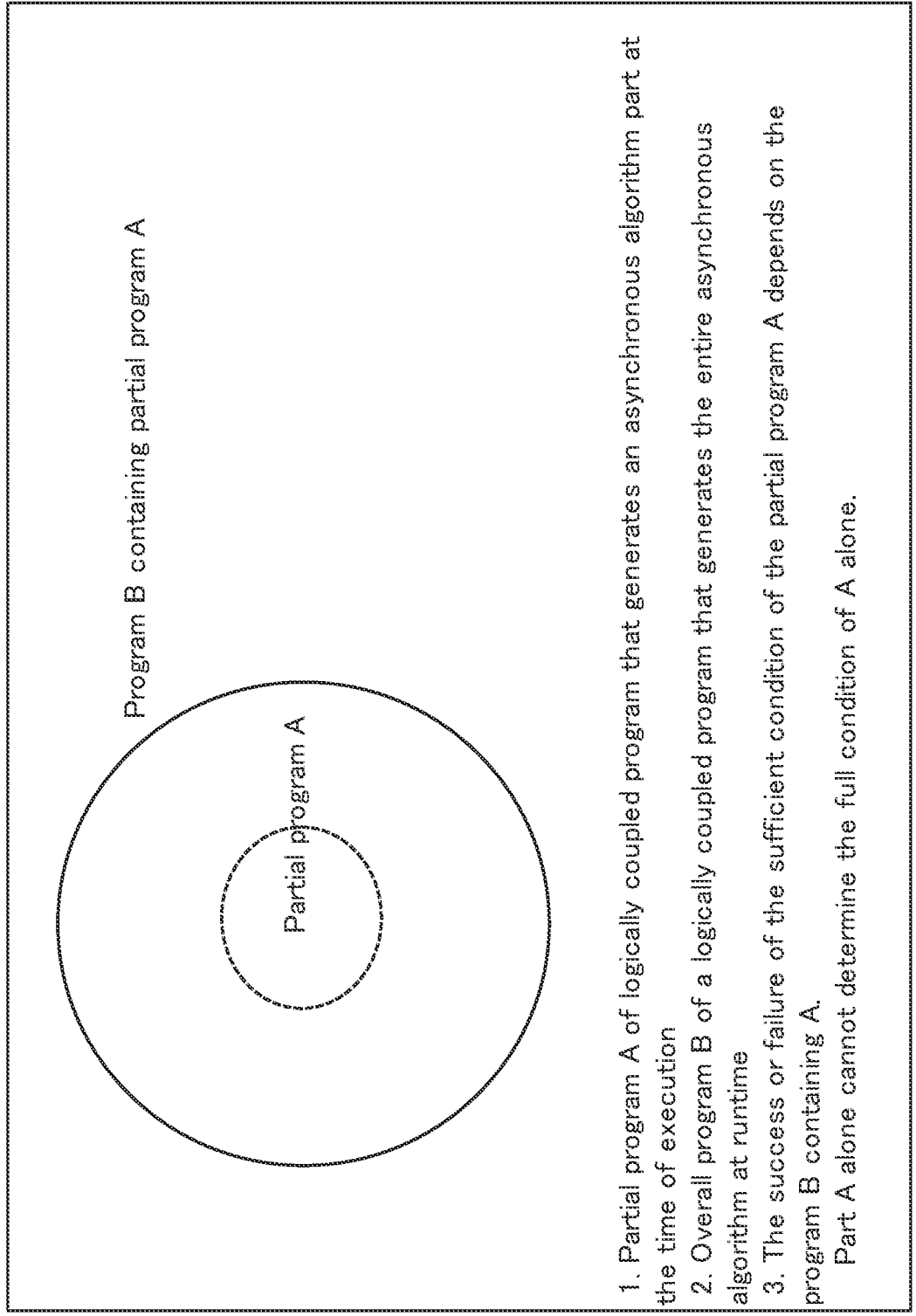
FIG. 6 shows relationship between the whole and part of the LCPS algorithm.
Figure 7:
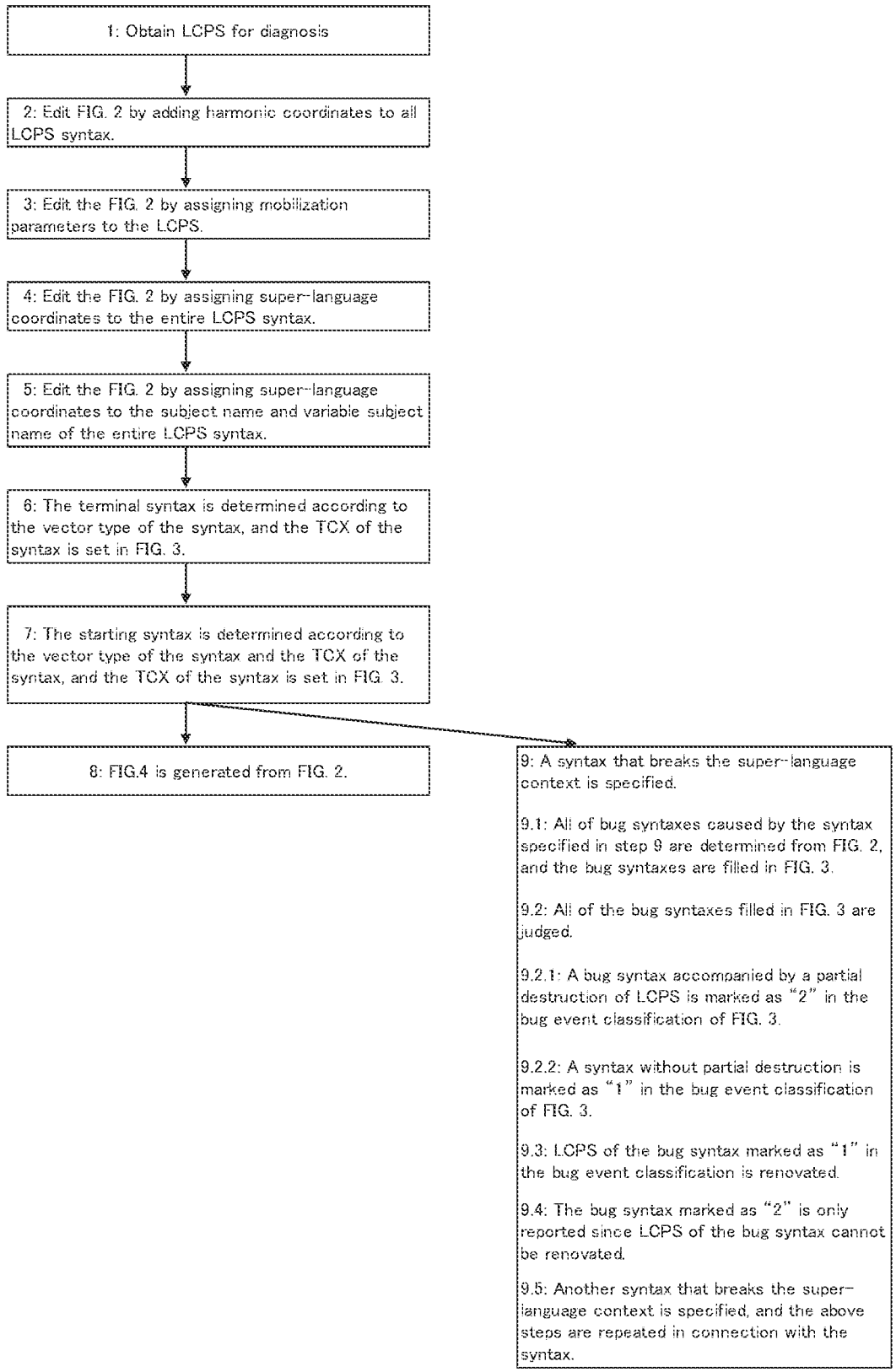
FIG. 7 shows implementation procedure of the present invention.
Figure 9:
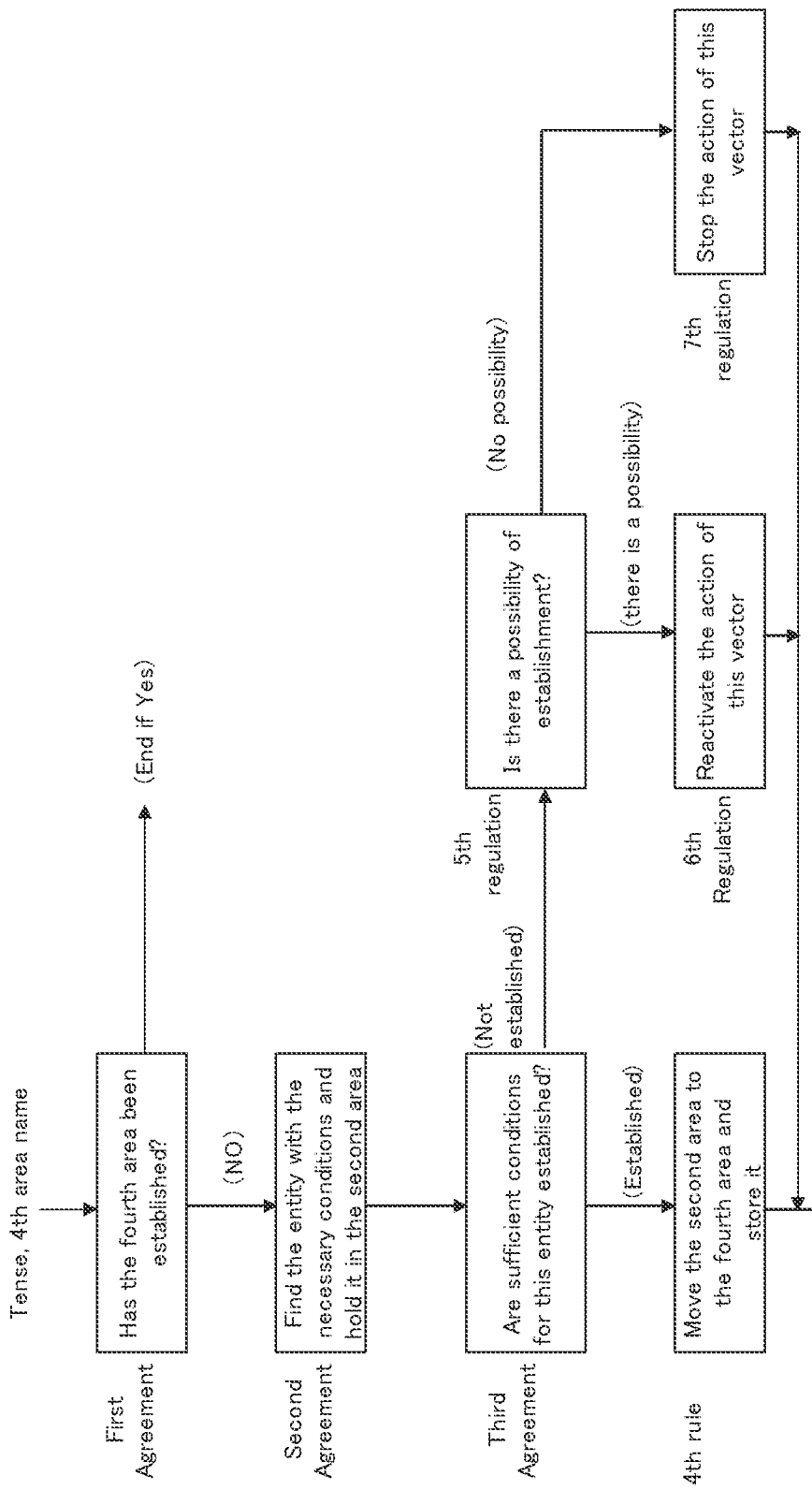
FIG. 9 shows subject vector structure.

The procedure for obtaining the LCPS super-language context from LCPS is shown below (see FIG. 7).

A set of "harmonic coordinates" indicating the execution order of the syntax is assigned to all LCPS syntax. As a result, the "LCPS harmonic context" is determined.

"Activation parameters" are assigned to all LCPS syntax.

"Super-language coordinates" are assigned to the subject name and variable subject name of the syntax.

By the above procedure, the information of FIGS. 2 and 2A-2F that establishes "LCPS super-language context" is determined.

Definitions of harmonic coordinates, LCPS harmonic context, activation parameters, super-language coordinates, LCPS super-language context are shown in the corresponding section (see FIGS. 2 and 2A-2F).

LCPS legitimacy cannot be established if there is a "discontinuity in the context" or "incorrect coding of the context" in the super-language context of the LCPS. How to find "discontinuity of context" and "incorrect coding of the context" in the super-language context of LCPS is shown in the corresponding section.

LCPS legitimacy is established if there is no discontinuity in the LCPS super-language context and no incorrect coding of the context.

If a discontinuity of the context or an incorrect coding of the context occurs, a "structure for catching bug syntax" is established in the LCPS super-language context. Information captured by this mechanism is shown in the format of FIGS. 3, 3A and 3B.

"The mechanism for catching bug syntax" is shown in the corresponding section.

INDUSTRIAL APPLICABILITY

Obviously, the completeness of a program that is an artifact and different from a machine is determined by the legitimacy of the entire algorithm that the program generates during execution. However, looking back over the last thirty years, there is a tendency that algorithmically speaking, slow and fast problems of secondary and tertiary problems are spoken. The basic problem of the algorithm is its legitimacy.

However, this problem is shelved. It is not much meaningful that buggy program can produce results quickly. The processing time problem is a problem that results in interpersonal relationships. Therefore, that the solution should be solved as a program problem is correct. It is not a problem to be solved by means that go beyond interpersonal relationships. And there are many other programmatic solutions. Therefore, what is important for a program is to enable legitimacy diagnosis of the algorithm, as the present invention does. The current program is full of bugs because this problem is abandoned. At the very least, the program provider is obliged to disclose the list of bug events inherent in the running program to the user. Incidentally, if the present invention is used, the bug event list of the running program can be clarified in the form of FIGS. 3, 3A and 3B.

In SF, intentional and special learning is not performed in advance. In SF, the mechanism of the synchronization algorithm (SA) that occurs at runtime (1) autonomously avoids bug events, and (2) autonomously disables virus information and establishes legitimate algorithms autonomously within that synchronization algorithm. If high-speed processing time exceeding the human related dimension is the problem of the SF, it is meaningful that the SF uses the high-speed processing time environment for solving the problem. On the other hand, as long as the above problems (1) and (2) are still unsolved in LCPS, and as long as the algorithm is NSA, LCPS is not in a position to discuss the problem of high processing speed. As long as AI is also created by LCPS, the issue is in the same position as LCPS. If it is not a program that is located beyond the program SF and does not require learning for an algorithm at the time of execution, it should not be referred to as AI. In terms of algorithm, the current AI is only an LCPS below SF which generates a synchronization algorithm.

Prof. Massani, who was founded in this field, pointed out that the hollowing of expertise and the monopoly of hollowing will start 20 years ago, but the reality is exactly as he pointed out.

Unless the asynchronous algorithm generated by LCPS is converted to a synchronous algorithm, there is technically and ideologically no evidence of special progress in the program world, as seen in autonomous driving and robots. The present invention is the discovery of the super-language context obtained from LCPS.

This is used to make possible to verify the legitimacy of NSA generated by LCPS.

The invention claimed is:

1. A method comprising:
generating super-language context from a source of logically connected program, and
verifying legitimacy of asynchronous algorithm generated when the logically connected program is executed using the super-language context,
wherein the generating super-language context includes assigning a line number to each syntax of the source of logically connected program, and identifying super-language coordinates, harmonic coordinates, syntax type, and subject vector type, for each syntax identified by the line number.

2. The method of claim 1 further comprising:
representing relationship among the syntaxes, each of which is identified by the line number and specified by the super-language coordinate, the harmonic coordinate, the syntax type, and the subject vector type.

3. A method comprising:
generating super-language context from a source of logically connected program,
verifying legitimacy of asynchronous algorithm generated when the logically connected program is executed using the super-language context, and
identifying a syntax of the source of logically connected program that causes the asynchronous algorithm to develop an illegitimate value,
wherein the identifying a syntax includes a step of determining that correction of bug syntax is impossible when there is a conditional statement that is closer to a starting subject name than a discontinuous syntax or an illegitimate syntax.

4. The method of claim 3 wherein:
the generating super-language context includes a step of assigning a line number to each syntax of the source of logically connected program, and a step of identifying super-language coordinates, harmonic coordinates, syntax type, and subject vector type, for each syntax identified by the line number, and
the identifying a syntax includes a step of specifying a starting subject name, a terminal subject name, presence or absence of discontinuity or error in the syntax, whether the starting subject name becomes a cause of a bug, a bug syntax constituting a bug event, a categorization code of the bug event, a partial destruction range, and a data fluctuation syntax, for each syntax identified by the line number of the source of logically connected program.

* * * * *